US011801649B2

(12) United States Patent
Schulte et al.

(10) Patent No.: US 11,801,649 B2
(45) Date of Patent: Oct. 31, 2023

(54) SHAPING DEVICE FOR CONTINUOUS SHAPING

(71) Applicant: CARBON TRUCK & TRAILER GMBH, Buxtehude (DE)

(72) Inventors: Benedikt Schulte, Hamburg (DE); Gerret Kalkoffen, Hamburg (DE)

(73) Assignee: CARBON TRUCK & TRAILER GMBH, Buxtehude (DE)

(*) Notice: Subject to any disclaimer, the term of this patent is extended or adjusted under 35 U.S.C. 154(b) by 95 days.

(21) Appl. No.: 17/596,942

(22) PCT Filed: Jun. 25, 2020

(86) PCT No.: PCT/EP2020/067947
§ 371 (c)(1),
(2) Date: Feb. 11, 2022

(87) PCT Pub. No.: WO2020/260534
PCT Pub. Date: Dec. 30, 2020

(65) Prior Publication Data
US 2022/0234312 A1 Jul. 28, 2022

(30) Foreign Application Priority Data

Jun. 27, 2019 (DE) .......................... 202019103567.6

(51) Int. Cl.
*B29C 70/50* (2006.01)
*B29D 99/00* (2010.01)
(Continued)

(52) U.S. Cl.
CPC .......... *B29C 70/504* (2013.01); *B29C 53/043* (2013.01); *B29C 70/222* (2013.01);
(Continued)

(58) Field of Classification Search
CPC .................................................. B29C 70/504
See application file for complete search history.

(56) References Cited

U.S. PATENT DOCUMENTS 10,245,793 B2* 4/2019 Witte .................... B29C 70/222
2005/0023728 A1* 2/2005 Benson ................. B29C 70/504
425/374

(Continued)

FOREIGN PATENT DOCUMENTS

DE 102014011943 2/2016
DE 102014019220 6/2016
(Continued)

*Primary Examiner* — Jeffry H Aftergut
(74) *Attorney, Agent, or Firm* — SAND, SEBOLT & WERNOW CO., LPA

(57) ABSTRACT

A forming device, system, and method for continuous forming of a semi-finished fiber product. The semi-finished fiber product is supported flatly from a first side and is at least locally restricted in its freedom of movement, for example pressed on and/or guided, on another side opposite the first side. The further restriction occurs in relation to a guiding area at at least one constant location or region past which the semi-finished fiber product is guided. Shaping tools and guiding areas defined thereby are used for support, and hold-down devices and their contact surfaces are used for further restriction. The further restriction is carried out transversely to a feed motion direction of the semi-finished fiber product through the forming device. The further restriction and the flat guidance serve to reduce formation of undulations and folds.

14 Claims, 6 Drawing Sheets

(51) Int. Cl.
  *B29C 53/04* (2006.01)
  *B29C 70/22* (2006.01)
  *B29C 70/52* (2006.01)
  B29K 307/04 (2006.01)
  B29L 31/00 (2006.01)

(52) U.S. Cl.
  CPC .......... *B29C 70/52* (2013.01); *B29D 99/0003* (2013.01); *B29C 2793/0027* (2013.01); *B29K 2307/04* (2013.01); *B29L 2031/003* (2013.01)

(56) References Cited

U.S. PATENT DOCUMENTS

| | | |
|---|---|---|
| 2005/0269016 A1 | 12/2005 | Oldani et al. |
| 2011/0135886 A1 | 6/2011 | Winter et al. |
| 2012/0328846 A1 | 12/2012 | Blot et al. |
| 2018/0009155 A1 | 1/2018 | Langeveld et al. |

FOREIGN PATENT DOCUMENTS

| | | |
|---|---|---|
| EP | 2265436 | 12/2010 |
| EP | 2722145 | 4/2014 |
| EP | 2985137 | 2/2016 |
| JP | 59179228 | 10/1984 |

* cited by examiner

SHAPING DEVICE FOR CONTINUOUS SHAPING

TECHNICAL FIELD

The invention relates to a forming device and to a system for the continuous forming of a semi-finished fiber product and a method for the forming of a semi-finished fiber product.

BACKGROUND

Nowadays, there are various objects consisting of semi-finished fiber products, such as carbon fibers. For this purpose, the semi-finished fiber product is removed from a roll, for example, and formed into the desired shape and subsequently stiffened or solidified in a system having a forming device. Unrolling the semi-finished fiber product from an extraction point, which provides the semi-finished fiber product for the further process and pushing it along in one direction, or—if the processing does not occur in a straight line—pushed in multiple directions, i.e. pushing direction(s)—into the further devices provided for the process is known from the prior art.

Furthermore, folding over parts and/or specific sections of the pushed or pulled semi-finished fiber product inside the forming device is also known. There are even systems allowing a continuous processing of the material (often also referred to as "endless processing"), while other systems exclusively allow a processing of the material one piece at a time (sometimes also referred to as "quasi-endless" processing), since the material must be cut off for forming. In addition, there are differences when it comes to the supplied material, which is usually provided from a roll with a limited material quantity, but then usually either supplied to the actual forming process in smaller sections or connected to the following material downstream of the actual forming process in order to form a quasi-endless material stream, for example, by stitching or by gluing.

In addition to a continuous processing of an endless or quasi-endless material, the processing of separate sections of material is also known. This offers more design freedom, however requires a higher level of effort.

In the following, endless material is understood to mean, in particular, a material having a length, said length being longer than the length of the forming section of the forming device, in particular, longer than the effective forming section of the forming device, in particular having a length greater than 50 m, in particular having a length greater than 70 m, however this length can be obtained as well through multiple material sections connected together.

Formed semi-finished fiber products having a defined shape are then produced using such methods. This formed semi-finished fiber product can then be stiffened and thereby become dimensionally stable, in particular by the curing of a binding agent. Depending on the applied process, formed semi-finished fiber products or dimensionally-stabilized formed semi-finished fiber products may be produced as pieces, in particular if they have a length of less than 50 m or if they are produced as endless. Dimensionally-stabilized formed semi-finished fiber products are then usually further processed, for example, to produce finished end products, such as chassis, by joining, for example.

By means of the known devices, the semi-finished fiber products can be formed into semi-finished fiber products having different profiles, in dependence upon the used device, for example into an L, U, Z, O, rectangular, hat or Ω (omega) shaped profile. Such a profile is characterized in that in a section passing through the material along a plane extending along the width of the material, a cutting line at least resembles the corresponding shape of the letter. It does not matter whether such a profile has the same proportions or the same sharp corner points or kink points as the desired profile, but rather that the basic letter shape is reflected by such a profile. Thus materials formed into an omega profile often have two short legs and a section between them extending away from the two legs and is, in particular, curved or forms a curve connecting both legs.

It is known from the above-mentioned techniques and devices that the material may crease and form folds during forming due to the forming. To alleviate the problem of creasing and/or the formation of folds during the forming of the pushed or drawn material using the above-mentioned techniques, it has further been proposed to arrange rollers in the forming regions, which rollers supportively push in the pushing direction, so to push the material more evenly and additionally through the forming path. As an alternative or additionally, it is proposed after the folding to smooth the folded sections by pressing and to produce dimensionally-stable materials by heating and pressing. Such techniques and devices are known, among others, from U.S. Patent Application No. 2012/0328846 A1, which discloses a piece-by-piece processing of fiber material and a pressing of the sections to be formed, from the European Patent EP 2 265 436 B1, which discloses a quasi-continuous/piece-by-piece process of material sections, and from EP 2 722 145 A1, which discloses a continuous process and a pulling apart of the fiber material by means of rollers.

In addition, pultrusion methods enabling a continuous production of plastic profiles, which may be fiber-reinforced, as the case may be, are known. The fiber material taken from a fiber shelf is coated with a binding agent by a fiber guide inside an impregnation and/or soaking device and, as the case may be, is reinforced by the addition and integration of further materials. The fiber material is then further formed in a forming device and cured by means of a curing device. The fiber material is then pulled through a device downstream of the curing.

Working with panels or gaps arranged successively through which the material is guided and formed piece-by-piece to feed the material to the pultrusion device or to the curing device is also known.

Alternately guiding two formed parts over the strand is disclosed in the German Patent Application No. DE 10 2014 011 943 A1. The formed parts can exhibit infeed bevels, but do not branch off any inclines continuously forming the strand running in the longitudinal direction of said strand. The infeed sections are merely provided to facilitate the infeeding of the material.

The German Patent Application DE 10 2014 019 220 A1 teaches the forming of a smooth strand by means of rollers having different shapes.

The US Patent Application US 2005/0 269 016 A1 discloses forming by means of a plurality of roller pairs arranged successively with different gaps positioned between the rollers of respectively one pair.

The Patent Application 2011/0135886 A1 also teaches forming by means of gaps between the rollers of a roller pair.

The Japanese Patent Application JP 59 179 228 A discloses the continuous forming of cross-sectional shapes with variable length by means of a pair of eccentric mounted rollers and the gap formed between them that cyclically changes in shape during the rotation of the rollers.

SUMMARY

One problem with the previously known systems and in particular, with the above-mentioned techniques, is that the semi-finished fiber product is not formed in an endless process but rather, formed semi-finished fiber products are merely manufactured piece-by-piece, and/or that folds or corrugations occur in the formed semi-finished fiber product. The corrugations, undulation or non-parallel position of semi-finished fiber products in formed semi-finished fiber products results in inhomogeneities, as well as undesirable and difficult-to-predict weaknesses in the workpiece.

The object of the present invention is accordingly to solve at least some of the above-mentioned problems in the production of endless formed semi-finished fiber products.

Consequently, the present invention relates to a forming device, system, and process for continuous forming, i.e. in particular, the production of endless formed semi-finished fiber products and of a corresponding workpiece. The invention relates to a forming device for continuous forming, having at least one, in particular, at least two, hold-down devices and at least one shaping tool, wherein the at least one hold-down device has a contact surface, the hold-down device extends over at least one forming section of the shaping tool, said forming section extending along at least one first direction of the shaping tool, and the at least one shaping tool, having an infeed end and an outfeed end opposite the infeed end, defines at least one guiding area, a) wherein the forming section extends out from a first plane transverse to the first direction toward the outfeed end, wherein the first plane is the plane closest to the infeed end, in which the at least one guiding area has at least one first concave cutting line section in the first plane, and b) wherein the guiding area also has a convex cutting line section in the first plane, and c) wherein the at least one guiding area has at least one second concave cutting line section in a second plane which is truly parallel to the first plane, d) wherein a first length between the contact surface and the guiding area in the first plane, measured along a first normal to the area of the guiding area on the concave cutting line section in the first plane is in the range of 0.8 to 1.2 times a second length between the contact surface and the guiding area in the first plane, measured along a second normal to the area of the guiding area on the concave cutting line section in the first plane, wherein the first normal and the second normal are at an angle to one another in a range between 30° and 45° in the first plane, and e) wherein a third length between the contact surface and the guiding area in the second plane, measured along a third normal to the area of the guiding area on the concave cutting line section in the second plane is in the range of 0.8 to 1.2 times a fourth length between the contact surface and the guiding area in the second plane, measured along a fourth normal to the area of the guiding area on the concave cutting line section in the second plane, wherein the third normal and the fourth normal are at an angle to one another in a range between 30° and 45° in the second plane, and f) wherein the first length is in a range of 0.8 to 1.2 times the third length and g) wherein the cutting line of the at least one guiding area with the first plane differs from the cutting line of the guiding area with the second plane, h) wherein the at least one hold-down device and/or its contact surface and/or the at least one guiding area is at least partially designed as a ramp.

The invention further comprises a system for continuous production, in particular endless production, of semi-finished products, having a supply device for supplying semi-finished fiber product, a pulling device, by means of which semi-finished fiber product is removed, in particular pulled, from the supply device, and a forming device arranged between the supply device and the pulling device, and an introduction section arranged between the forming device and the supply device.

The invention further comprises a method for forming a semi-finished fiber product, wherein the semi-finished fiber product is pulled off of at least one supply device by means of a pulling device and is pulled through a forming device having at least one hold-down device and at least one shaping tool, wherein a forming of the semi-finished fiber product is effected by deflection of the semi-finished fiber product while the semi-finished fiber product is pulled through at least one gap, said gap being delimited by at least one first concave section of a first guiding area defined by the at least one shaping tool, and by at least one first contact surface of the hold-down device.

The invention further comprises a workpiece consisting of a formed semi-finished fiber product cured by means of binding agents, wherein the semi-finished fiber product and/or the formed semi-finished fiber product formed thereby has at least two fiber layers arranged one above the other, wherein the fibers of the at least two fiber layers have at least two different directions of longitudinal extension and wherein the two different directions of longitudinal extension enclose an angle in the range from 30 to 150°, in particular in the range from 40 to 160°, and wherein the workpiece has a length of at least 0.5 m, in particular of at least 1 m, and wherein the workpiece, in all cross-sections over the length transverse, in particular, perpendicular, to the length, has at least one curvature, in particular a curvature of the fiber layers, in particular of at least some of the fibers of the fiber layers, characterized in that the undulation of the fiber layers is so small that the height of an undulation does not exceed 15% of its width and/or that the height of each undulation does not exceed 25% of the thickness of the component and/or that the fiber layers respectively lie parallel to one another.

Advantageous further developments of a device, a system, or a method are set out hereafter. The forming device may be characterized in that the distance between the first and the second plane, measured along the first direction, may be greater than the first and the third length, in particular, at least 10 times greater than the first and the third length. The contact surface of the hold-down device may have a first convex hold-down device cutting line section in a plane transverse to the first direction, in particular, in the first and/or second plane. The guiding area may have both a concave and a convex cutting line section in a third plane arranged between the first and the second plane, said third plane being parallel to the first and/or the second plane, and wherein the distance from the third plane to the first plane and/or to the second plane may be at least 20% of the extension of the forming section and/or at least 0.2 m. The cutting line of the at least one guiding area in the first plane may differ from the cutting line of the guiding area in the third plane, in particular, a first cutting line section distance between the concave and convex cutting line sections in the first plane may differ from a second cutting line section distance between the concave and convex cutting line section in the third plane, in particular, the first cutting line section distance may be less than the second cutting line section distance, in particular, it is less than the second cutting line section distance by at least 10%. The first direction of the feed motion direction at least in the first and/or second and/or third plane may correspond to and/or may be parallel to a first forming plane, in which the infeed section and/or the outfeed section is arranged, and/or may correspond to a vector from the centroid of the infeed end to the centroid of the outfeed end and/or wherein the hold-down device may exhibit a longitudinal extension which is not parallel to the first direction and/or to a feed motion direction and/or to a/the first forming plane and/or to a tangential area of the shaping tool at the infeed end parallel to the first direction, and/or to a/the feed motion direction, in particular, not parallel in the plane which best approximates a plane at the infeed end and/or wherein the at least one hold-down device may have a first longitudinal extension, and the guiding area may have a second longitudinal extension, especially parallel to the first longitudinal extension, wherein the ratio of the first longitudinal extension to the second longitudinal extension may be in the range from 0.8 to 1.2, in particular, in the range from 0.9 to 1.1, in particular, the length of the first longitudinal extension may correspond to the second longitudinal extension. The forming device may have at least two hold-down devices, wherein a first hold-down device distance between two hold-down devices in the first plane may be less than a second hold-down device distance between the two hold-down devices in the second and/or in the third plane, or that the forming device may have at least one hold-down device, wherein said hold-down device may exhibit in the first plane and transversely to the first direction a first extension which may be smaller than a second extension of the hold-down device in the second and/or third plane transversely to the first direction and/or wherein the hold-down device may be rotatably mounted around a first axis parallel to its longitudinal extension and/or wherein the contact surface of the hold-down device may be comprised of Teflon or has a coating made of Teflon. A longitudinal extension of the at least one contact surface parallel to the first direction may have at least 60% of the extension of the forming section parallel to the first direction, wherein, in particular, the contact surface may be continuous over at least 50% of the longitudinal extension. The at least one shaping tool and/or the at least one guiding area on the first plane may have a first transverse extension in the first plane, in particular, parallel to the forming plane, and the at least one hold-down device, in particular, all hold-down devices, and/or the at least one contact surface, in particular, all contact surfaces, may have a second transverse extension in the first plane, in particular, parallel to the forming plane, wherein the first transverse extension may be longer than the second transverse extension, in particular, by at least 50% of the second transverse extension and/or wherein at least one guiding area may have a curvature in an infeed plane parallel to the first plane transverse, in particular, perpendicular, to the infeed plane and parallel to the first direction, said curvature may have a maximum of 1 rad, in particular, a maximum of 0.5 rad, in particular a maximum of 0.1 rad, in particular a maximum of 0.05 rad, wherein the first plane may be between the infeed plane and the second and/or the third plane.

In the system according to the invention, the introduction may have has at least one first deflection means, in particular a deflection roller and/or a deflection panel, to guide the removed semi-finished fiber product, wherein one, in particular all, shortest connection vector(s) from the deflection means to the infeed end enclose(s) an angle to the first direction which may be less than or equal to 90° and/or wherein the infeed end may be designed convex, in particular in an infeed plane perpendicular to the first plane, and/or the deflection means may be designed convex, in particular in a deflection plane perpendicular to the first plane and/or parallel to the infeed plane, and/or wherein at least one injection device or impregnation device for the application of a binding agent may be arranged upstream and/or downstream of the forming device and/or the forming section, and/or a curing device may be arranged downstream of the injection device or the impregnation device, or may be arranged at the forming device and/or at the forming section.

In the method in accordance with the invention, the gap may be formed such that it has a length of at least 10 cm in the direction in which the semi-finished fiber product is pulled, and the shape and/or position of the gap in cross section, in particular perpendicular to the pulling direction, may continuously change over at least 10 cm of the length of the gap, wherein in particular, however, its cross-sectional area and/or its gap height may not change and/or wherein the semi-finished fiber product may be pulled over a convex section of the guiding area, in particular at a first end, in particular, an end of the forming device facing toward the supply device.

A semi-finished fiber product is to be understood, in particular, as a material consisting of multiple fibers, for example, natural, glass or chemical fibers, such as plastic or carbon fibers, wherein the fibers together define a material having extension in both width and length. In particular, such a material has a length of several meters and/or a width of a few decimeters and/or a thickness less than ten centimeters. Generally speaking, semi-finished fiber products are rovings and/or scrims, woven fabrics, warp-knitted fabrics and/or flat-knitted fabrics, wherein the individual fibers are mostly sewn or woven. Semi-finished fiber products and/or fiber layers made from non-undulating fibers, wherein the fibers are, in particular, sewn to one another, are preferred. In particular, rovings and/or scrims are used and/or contained by the workpiece. The workpiece can have one semi-finished fiber product or a plurality of semi-finished fiber products, in particular arranged one above the other. A semi-finished fiber product can have one fiber layer, in particular two, but also multiple fiber layers arranged one above the other and connected to one another, in particular, sewn to one another. In particular, the fibers of a fiber layer are also connected to one another, in particular they are sewn. In the method, device and/or system, a minimum of two semi-finished fiber products, in particular, are arranged one above the other and guided together, in particular, through the forming device. The device, the forming device and/or the system are, in particular, set up accordingly to permit common guidance. Furthermore, the semi-finished fiber product can be dry fiber material, such as, for example, a monoaxial or multiaxial scrim made of glass fibers and/or carbon fibers, glass fleece, recycled carbon fleece, thermosetting and/or thermoplastic material, as well as prepreg material (pre-impregnated fiber material), i.e., dry fiber material, which is treated, impregnated and/or coated with a plastic.

A forming device for continuous forming is to be understood, in particular, as a device in which an interruption of the forming process or of the semi-finished fiber product to be formed, in particular by cutting and/or separation, especially of the semi-finished fiber product, is not required for and/or during the forming. The present device as well as the present process thus differ fundamentally from the devices and methods which are merely suitable for the implementation of a forming by interrupting the guiding of the semi-finished fiber product and/or by cutting off the semi-finished fiber product. In comparison to this prior art forming device, sometimes referred to as a quasi-endless forming device, the forming device according to the invention and/or the method according to the invention does not require any stopping and/or it is not necessary for the material to be stopped in certain sections and/or cut to size in order to be processed and/or formed subsequently. In comparison to the forming devices and methods from the prior art, which comprise at most a quasi-endless forming, consequently, there is the advantage that the forming process, but also the downstream or upstream connected devices and their processes, do not have to be interrupted, which enables a reproducible forming of the semi-finished fiber product and economical process management. Any inaccuracies caused, for example, by a stop which is not always uniform or a cut which is not always carried out in the same sections, and consequently unevenly shaped semi-finished fiber products, are consequently circumvented by means of the forming device according to the invention or the method according to the invention.

In addition, the invention offers clear advantages over the known continuous methods, for example, forming by means of successive gaps in panels or between two rollers of a roller pair.

In this context, the inventors have recognized, in particular, that the material to be formed, the semi-finished fiber product, should be flatly supported from a first side, and should be further restricted in its freedom of movement, for example pressed and/or guided, at least locally, on another side of the semi-finished fiber product opposite the first side. The further restriction takes place in relation to the guiding area at at least one constant location and/or region past which the semi-finished fiber product is guided, in particular by means of a gap which is stationary relative to the guiding area and through which the semi-finished fiber product is guided. For this purpose, the inventors have, in particular, provided the use of shaping tools and guiding areas defined by them for support, and, for further restriction, they have provided hold-down devices and their contact surface. In this context, the further restriction occurs especially transversely to a first direction, a feed motion direction of the semi-finished fiber product through the forming device. In comparison to the prior art, the inventors have recognized that the at least local further restriction and the flat guidance together result in many advantages, especially reducing and especially preventing the formation of undulations and folds.

This applies especially to the use of fibers, especially carbon fibers, which are changed, especially curved, in longitudinal extension due to the forming.

According to the invention, a forming device has at least one, especially at least two, hold-down devices and at least one shaping tool.

The at least one hold-down device has a contact surface. This contact surface is especially set up to be brought into contact with the semi-finished fiber product to be processed, especially formed, by means of the forming device, and especially is brought into contact with the said semi-finished fiber product. In particular, the hold-down device has a surface, whereby at least part of this surface represents the contact surface. In particular, it is conceivable that the hold-down device is mounted in a rotatable manner, in particular around its longitudinal axis, in particular around its central axis, whereby for example, in such an advantageous embodiment of the hold-down device, different parts of the contact surface contact the semi-finished fiber product at different times. In particular, each hold-down device has at least one, in particular exactly one, contact surface.

However, the hold-down device can also be designed as a flat element, similar to the shaping tool, for example, so that in every cross-section over a certain length of the shaping tool, a gap of at least 10 cm is formed between the shaping tool and the hold-down device, which gap changes its shape from one cross-section to the next and/or continuously changes over the certain length. For example, the hold-down device can have a hold-down device guiding area running parallel to the guiding area of the shaping tool. Consequently, the gap can be implemented significantly larger in two spatial directions than in the third spatial direction, in particular at least 5 times larger, in particular measured in terms of the imaginary bending of the areas into planes. In particular, the areas forming the gap in this variant are not flat but curved areas, in particular areas screwed and/or twisted in space, which in particular have a constant spacing. In this context, the parallelism of the areas is to be seen especially locally and especially when or in the region in which the surfaces have a constant spacing from one another.

The gap is advantageously formed such that it has a length of at least 10 cm in the pulling direction of the semi-finished fiber product or in the first direction and its shape changes continuously over this length without changing in particular its cross-section area and/or its gap height. This gap may even be understood as a continuous implementation of the discontinuous situation in which slit panels, known per se from the prior art, are arranged successively yet spaced apart, immediately following one another and touching each other without distance with only very minor changes in the gap shape between two successive panels.

According to the present invention, the at least one shaping tool defines at least one guiding area, especially forms it and/or especially has it. Advantageously, the shaping tool is especially flat components having in particular a guiding area and/or rods, partial surfaces and/or support points defining a common guiding area. Edges, ends and/or outer surfaces of the at least one shaping tool especially define and/or form the at least one guiding area. The shaping tool has an infeed end and, opposite the infeed end, an outfeed end. During forming of a semi-finished fiber product, said semi-finished fiber product is introduced into the infeed end, guided over the guiding area, and formed, with at least temporary interaction with the at least one hold-down device, and discharged in the outfeed end, especially transferred to any devices arranged downstream, as the case may be.

For the purpose of defining some orientations, a first direction is used repeatedly in the following. This is based on the direction of the feed motion or the direction of movement of the semi-finished fiber product through the forming device, in particular over the shaping tool, in particular the guiding area. Advantageously, the first direction is the movement or thrust directions, in particular the feed motion directions of the semi-finished fiber product or of a component (in particular by vector decomposition within the horizontal and vertical Cartesian coordinate system along the axes) of the movement or thrust directions, in particular the feed motion directions of the semi-finished fiber product. Advantageously, the first direction, in particular the feed motion direction, at least on the first and/or second and/or third plane and/or at the infeed end, is parallel to a first forming plane, and/or the first direction, in particular the feed motion direction, at least on the first and/or the second and/or third plane and/or at the infeed end, corresponds to a first forming plane, especially to at least one of the vectors spanning the first forming plane and its direction. The infeed section and/or the outfeed section and/or the infeed and and/or the outfeed end are arranged especially in the first forming plane, especially such that the semi-finished fiber product is guided within the plane, in particular over at least one line in the plane and/or over a surface section of the plane, whereby said line and/or surface section especially extend over the width of the semi-finished fiber product. Advantageously, the first direction corresponds to the averaged feed motion directions of a semi-finished fiber product moving through the forming section. In this context, it should be noted that the feed motion direction of the semi-finished fiber product differs between different places of the shaping tool, in particular both over the width of the semi-finished fiber product and over the passage through the forming device.

According to the invention, the at least one hold-down device extends at least over a forming section of the at least one shaping tool extending along at least the first direction and/or the guiding area defined by the at least one shaping tool. Consequently, a forming section is in particular defined by the extension, in particular longitudinal extension, of at least one hold-down device and of at least one shaping tool and/or a guiding area, and/or extends in particular over its longitudinal extension along the first direction.

According to the present invention, the forming section further extends out from a first plane in the direction of the outfeed end. The first plane is especially transverse, especially perpendicular, to the first direction and/or to a longitudinal extension of at least one hold-down device and/or of at least one shaping tool. The first plane is the plane closest to the infeed end, in which plane the at least one guiding area has at least one first concave cutting line section in the first plane. In assessing a concave cutting line section, as opposed to a convex line section, the shaping tool is viewed starting from the guiding area. The curvature exhibited by the concave cutting line section consequently points or protrudes from the guiding area into the object, in this case the shaping tool, in comparison to an object without such a curvature. This becomes particularly clear when one imagines the shaping tool to be thicker, as the case may be, for example, with a wall thickness of several centimeters or meters than is actually the case, and this additional imaginary wall thickness extends away from the guiding area.

For example, if one considers a straight line of two points, which on both sides lie on the cutting line and on the guiding area outside the respective cutting line section, this line does not intersect the guiding area and at least in part, is spaced at a distance from the guiding area and/or from the cutting line, whereby between the two points, the shaping tool in particular lies on the same side of the line as the guiding area. In this context, a concave cutting line section is to be regarded in particular both as a curvature in the sense of a curve and a curvature characterized by at least one kink or a discontinuity in the curve.

The first plane represents especially a, especially imaginary, plane running in particular through the forming device, in particular through the forming section, or intersecting it and/or extending transversely to the longitudinal extension of the forming device, especially to that if the forming section, and/or to that of the hold-down device and/or to that of the shaping tool and/or extending transversely, in particular perpendicularly, to the first direction. In this context, a cutting line section is to be understood in particular as a section or part of a line of a section along the first plane, through the guiding area and/or the shaping tool and/or the forming section, for example similar to a section of a plane with a sphere, which, at least if the center of the circle lies in the plane, has a circle as a cutting line. If the surface of the sphere or a part of it were to represent the guiding area—although this does not function for practical reasons, so purely hypothetically—all the cutting line sections would be convex. If you consider a spherical shell and regard its internal surface or part of it as a guiding area—also purely hypothetically—all of the sections of the cutting line would be concave. In particular, the forming section starts in the first plane, where, in the course of the forming device, starting from the infeed end, the guiding area first or for the first time has a concave cutting line section within this plane.

Furthermore, according to the present invention, the guiding area also has a convex cutting line section in this first plane.

In a second plane, which is truly parallel to the first plane, and for this reason in particular is parallel but not identical, the guiding area has at least one second concave cutting line section. In particular, the second plane is the plane arranged closest to the outfeed end and having at least one concave cutting line section. The concave cutting line sections, in particular, of the first and second planes, can be implemented identical or different.

The device advantageously has at least two concave cutting line sections in the first and/or second plane, and/or at least two convex cutting line sections in the first plane. Such an advantageous further embodiment enables a profile with two opposing bends and/or kinks in cross section, for example a Z, hat, U, double T or an omega-shaped profile, to be formed in a particularly simple and accurate manner.

In particular, the device is set up, the method is performed and/or the workpiece is designed such that the workpiece and/or the deflected shape has an L, U, Z, hat or Ω (omega)-shaped profile or a closed profile, such as an O-profile or a rectangular profile or a profile having several enclosed cavities, such as a double rectangular profile. A closed profile or a profile having one or more completely enclosed cavities can be achieved, for example, by a forming in which the sides of the semi-finished fiber product are joined or at least one side of the semi-finished fiber product is deflected back to the semi-finished fiber product.

Some arrangements of the at least one hold-down device and of the at least one shaping tool are particularly preferred. The inventors have discovered, in particular, that the following arrangement of the hold-down device and of the shaping tool, or consequently, of the contact surface and of the guiding area, in the first and second planes is particularly advantageous.

As a consequence, it is preferred that a first length between the contact surface and the guiding area in the first plane has a length in the range of 0.8 to 1.2 times, in particular 0.9 to 1.1 times, in particular 0.95 to 1.05 times, in particular exactly the same as, a second length between the contact surface and guiding area in the first plane and/or that a first length between the contact surface and guiding area in the first plane is in the range of 0.8 to 1.2 times, in particular 0.9 to 1.1 times, in particular 0.95 to 1.05 times, in particular exactly the same as, a second length between the contact surface and guiding area in the first plane. The first length is measured along a first normal to the area of the guiding area on the concave cutting line section in the first plane. The second length is measured along a second normal to the area of the guiding area on the concave cutting line section in the first plane. According to the present invention, the first and the second normal in the first plane are at an angle between 30° and 45° to one another. Consequently, the first length has, for example, approximately the same length as the second length, whereby the normals used for the determination intersect at an angle in the range between 30° and 45°, in particular, the normals are not directly adjacent to one another, but rather, especially in the concave cutting line section, they are spaced from one another such that both normals intersect at an angle in the range between 30° and 45°. In this manner, for example, it can be ensured that the hold-down device forming the contact surface is arranged in the vicinity of a section of the guiding area in which the forming is to take place and consequently, a concave section, for example for the kink in an L, U, hat or Omega-shaped profile, is formed in said cutting line section.

This condition is also given when the first and the second length exhibit a zero amount, i.e. the hold-down device is adjacent to the guiding area on both normals. In particular, all lengths measured along the normals positioned between the first and the second normals also have a length in the mentioned range. In particular, for said purpose, the normals that satisfy the stated conditions and when measured along the cutting line, have the greatest distance from one another, are, to the greatest extent possible, to be considered as the first and the second lengths.

According to the present invention, a third length between the contact surface and the guiding area in the second plane has a length in the range of 0.8 to 1.2 times, in particular of 0.9 to 1.1 times, in particular of 0.95 to 1.05 times, in particular exactly the same as, a fourth length between the contact surface and the guiding area in the second plane and/or a third length between the contact surface and the guiding area in the second plane is in the range of 0.8 to 1.2 times, in particular of 0.9 to 1.1 times, in particular of 0.95 to 1.05 times, in particular exactly the same as, a fourth length between the contact surface and the guiding area in the second plane. In this context, the third length is measured along a third normal to the area of the guiding area located on the concave cutting line section in the second plane. The fourth length is measured along a fourth normal to the area of the guiding area located on the concave cutting line section in the second plane. According to the present invention, the third and the fourth normal in the second plane are at an angle to one another in a range between 30° and 45°. Consequently, for example, the third length has approximately the same length as the fourth length, wherein the normals used for this are not directly adjacent to one another, but rather are spaced from one another in the concave cutting line section such that both normals intersect at an angle in a range between 30° and 45°. In this manner, it can be ensured, for example, that the hold-down device forming the contact surface is arranged in the vicinity of a section of the guiding area in which the forming is to take place and consequently a concave section, for example for the kink in an L, U, hat or Omega-shaped profile, is formed inside said cutting line section.

This condition is also given when the third and fourth lengths have a zero amount, i.e., the hold-down device is adjacent to the guiding area. This condition is also given in the event the third and fourth length exhibit a zero amount which means that the hold-down device is adjacent to the guiding area on both normals. In particular, all lengths measured along the normals positioned between the third and the fourth normals have a length in the mentioned range as well. In particular, for said purpose, the normals that satisfy the stated conditions and when measured along the cutting line, have the greatest distance from one another, are, to the greatest extent possible, to be considered as the third and fourth normals.

In particular, the first, second, third and/or fourth length is a first, second, third and/or fourth distance between the contact surface and the guiding area in the respective first or second plane. In this context, the first and/or the third length, like the first and/or the second, can also exhibit a zero value, whereby in particular the distance may also correspond to zero, in particular when no semi-finished fiber product is present between the hold-down device and the shaping tool and/or in the event the hold-down device is especially resilient and/or spring-loaded and pressed against the guiding area, and especially in the event it forms and/or can form a distance between the hold-down device and the guiding area by sliding in a semi-finished fiber product. In particular, the above-mentioned requirements for the relative position of the hold-down device and the guiding area (in particular, the first, second, third and/or the fourth length) are also satisfied when a semi-finished fiber product, in particular one having a homogeneous and/or constant thickness over its length and/or width, is present between the hold-down device and the guiding area.

Advantageously, the first, second, third and/or the fourth length and/or respective distance is less than or equal to 10 dm and/or the hold-down device and/or the guiding area and/or the shaping tool is set up such that the first, second, third and/or the fourth length and/or distance is less than or equal to 10 dm.

Furthermore, according to the present invention, the first length is in the range of 0.8 to 1.2 times, in particular of 0.9 to 1.1 times, in particular of 0.95 to 1.05 times, in particular exactly the same as, the third length. Thus, for example, it is ensured that the forming in the first plane takes place in the same manner or at least in a similar manner, in particular as precisely, as in the second plane. As a consequence, this advantageously results in a uniform forming of a semi-finished fiber product when a forming device according to the present invention is used.

This condition is also given in the event the third and first length exhibit a zero amount, i.e., the hold-down device is adjacent to the guiding area.

The first as well as the second plane consequently intersects the guiding area, respectively resulting in a cutting line inside the guiding area. According to the present invention, the cutting line of the at least one guiding area with the first plane differs from the cutting line of the at least one guiding area with the second plane. For example, the cutting line in the first plane, starting from a first end of the cutting line, has a first section with a first section length and a second section adjoining the first section and extending up to the end of the cutting line opposite the first end of the cutting line in the first plane, or up to a further section adjoining the second section with a second section length, and the cutting line in the second plane, starting from a first end, which is on the same side end of the guiding area as the first end of the cutting line in the first plane, has a first section with a third section length and a second section adjoining the first section and extending up to the end of the cutting line opposite the first end of the cutting line in the second plane, or extending up to another section adjoining the second section with a fourth section length, wherein the first section length differs from the third section length and/or the second section length differs from the fourth section length and wherein the first section, in particular at least in the central part, extends along a direction in both the first and the second plane, said direction being different from the direction in which the second section extends, at least on average, in particular.

Consequently, the forming device according to the present invention differs from the forming devices according to the prior art, in particular due to the concave cutting line section, in addition to other cutting line sections and the arrangements thereof. With help of a guiding area and contact surfaces according to the present invention, it is possible, in particular, to implement an endless production of a material, in particular of semi-finished fiber products, formed in the forming device according to the present invention, wherein by means of the cutting line section according to the present invention, the material has few or no folds due to the forming process. The forming section advantageously exhibits a length greater than 1 cm, in particular greater than 1 dm, and/or a length of a maximum length of 10 m, in particular of a maximum length of 5 m. The forming section advantageously exhibits a width greater than 1 cm, in particular greater than 1 dm, and/or a width of a maximum width of 5 m, in particular in the first plane. The semi-finished fiber product is advantageously guided, in particular pulled, through the forming device, and in particular the shape and/or the profile of the semi-finished fiber product is processed, especially is deflected, over the width of the semi-finished fiber product by means of and through the forming device. In particular, the semi-finished fiber product is introduced over its, in particular elongated, width, into one plane, in particular, the infeed plane.

Advantageously, the distance between the first and the second plane, in particular measured along the first direction, is greater than the first and the third length, being in particular at least 10 times greater than the first and the third length. In particular, the distance between the first and second plane, in particular measured along the first direction, is greater than 30 cm, in particular greater than 50 cm, in particular greater than 100 cm. Consequently, the forming device according to the present invention is advantageously a device exhibiting a forming section having a longitudinal extension which is greater than the distance between the hold-down device and the shaping tool, or between the contact surface and the guiding area, or in-between the section, or the gap where the material, in particular the semi-finished fiber, is formed and/or deflected.

Advantageously, at least one contact surface of the at least one hold-down device, in particular each contact surface of the at least one hold-down device and/or of all of the hold-down devices, intersected by a plane transverse, especially perpendicular, to the first direction, in particular in the first and/or second plane and/or in a further plane that is truly parallel to the first and/or a second plane, has a first convex hold-down cutting line section. In particular, the hold-down device with its contact surface has a convex hold-down cutting line section complementary to the concave cutting line section of the guiding area or to a part of at least 50% thereof, especially approximately and/or exactly, in a plane transverse, especially perpendicular, to the first direction, especially in the first and/or second plane and/or in a further plane that is truly parallel to the first and/or second plane. Due to such a geometry of the hold-down device, a forming can be implemented especially advantageously, especially due to a relatively large-area contact that simultaneously takes place solely in exactly those sections where the material, in particular semi-finished fiber product, is to be formed and/or deflected. In particular, the complementarity is to be evaluated by placing a semi-finished fiber product on the guiding area and by considering the surface of the semi-finished fiber product facing away from the guiding area as the guiding area.

The at least one guiding area and/or contact surface advantageously has a ramp and/or at least one guiding area and/or contact surface is at least partially designed as a ramp. In particular, the device is designed for pulling the semi-finished fiber product at least over a length of 10 cm, in particular of at least 0.5 m, over this ramp and/or is designed for pulling said product flatly adjoining said ramp, in particular adjoining over a length of at least 10 cm, in particular of at least 0.5 m, and especially, adjoining over the width of the ramp, over this ramp. Advantageously, the guiding area constitutes the ramp, at least in a central region, in particular a central region of the width of the guiding area and/or of the forming section and/or of the forming device and/or the central region, running transversely, in particular perpendicularly, to the first direction. In particular, such a configuration enables simple processing, forming and/or deflection of the material, especially of semi-finished fiber product, into the desired shape, without, however, causing folds in the material, especially semi-finished fiber product, especially in the semi-finished fiber products, during and through the forming, wherein endless production of the formed material, in particular of the formed semi-finished fiber products, is simultaneously possible. In particular, the ramp extends at least from the first to the second plane.

Advantageously, in a third plane arranged between the first and the second plane, parallel, especially truly parallel, to the first and/or the second plane, the guiding area exhibits both a concave and a convex cutting line section, wherein the distance from the third plane to the first plane and/or to the second plane is at least 20% of the extension of the forming section and/or is at least 0.2 m and/or the third plane is arranged between the first and the second plane.

The third plane therefore also intersects the guiding area, thus forming a cutting line with the guiding area. Advantageously, the cutting line of the at least one guiding area in the first plane differs from the cutting line of the guiding area in the third plane. Advantageously, a first cutting line section distance between the concave and the convex cutting line section in the first plane differs from a second cutting line section distance between a concave and convex cutting line section in the third plane. Advantageously, the first cutting line section distance is smaller than the second cutting line section distance, especially is at least 10% less than the second cutting line section distance. By means of the advantageous designs of the guiding area in the first and the third plane, a change of the shape can be implemented in a particularly easy manner without building up additional tension in the material, especially semi-finished fiber product, which can result in folds or undulations in the material during and through the forming and deflection.

Advantageously, the at least one hold-down device exhibits a first longitudinal extension, whereby the first longitudinal extension is especially not parallel to the first direction and/or to a feed motion direction, especially at the infeed end, and/or to a/the first forming plane and/or to a tangential area of the shaping tool tangential to the infeed end and parallel to the first direction and/or a/the feed motion direction, in particular is not parallel in the plane best approximating the shape of the guiding area at the infeed end. Such an advantageous design of the first longitudinal extension of the hold-down device consequently results in an arrangement of the hold-down device such that the formed profile changes over the course of the forming and/or of a deflection of the semi-finished fiber product during the translation of the semi-finished fiber product through the forming section.

Advantageously, the at least one hold-down device exhibits a first longitudinal extension and/or width extension, whereby the first longitudinal extension is not perpendicular to the first direction and/or to a feed motion direction, in particular at the infeed end, and/or to a/the first forming plane and/or to a tangential surface of the shaping tool extending tangentially at the infeed end and parallel to the first direction and/or to a/the feed motion direction, especially does not extend perpendicularly to the plane best approximating the shape of the guiding area at the infeed end. Consequently, the hold-down device according to the present invention is advantageously not a roller having an axis of symmetry and/or a longitudinal extension perpendicular to the first direction and/or feed motion direction, wherein the roller is rotatably mounted along this extension and along an axis parallel thereto, to support and drive forward the feed motion of the semi-finished fiber product.

Advantageously, the hold-down device has a first longitudinal extension and the guiding area has a second longitudinal extension, in particular parallel to the first longitudinal extension, wherein the ratio of the first longitudinal extension to the second longitudinal extension, in particular that of their lengths, is in the range from 0.8 to 1.2, in particular from 0.9 to 1.1, wherein in particular the length of the first longitudinal extension corresponds to that of the second longitudinal extension.

Advantageously, the relative position between the at least one hold-down device and the at least one shaping tool and/or the at least one guiding area and/or the first, second, third and/or fourth length are modifiable in a controllable manner. Advantageously, with such a control, before a beginning of a semi-finished fiber product starts to be fed in, the distance between the hold-down device and its contact surface and the guiding area may be increased such that the semi-finished fiber product can be guided into the infeed end and into the beginning of the forming section, in particular into the convex and concave cutting line section in the first and especially in the second plane as well. The distance can then be reduced again so that the semi-finished fiber product can be put in contact with or brought proximate to the contact surface and/or guiding area, and the forming process can then be executed in continuous operation in the course of the normal forming process, wherein the requirements for the first, second, third and/or fourth length are satisfied, especially at least during the continuous operation and/or during the proximate state.

Advantageously, the shaping tool is made of one part and/or of one piece, in particular as a one-part and/or as a one-piece pre-form. As an alternative, the shaping tool is advantageously made of a plurality of shaping tool parts. In this context, the one-part and/or the one-piece or, as an alternative, the plurality of shaping tool parts all together, define, delimit and/or form the guiding area.

Advantageously, the forming device has at least two hold-down devices, whereby a first hold-down device distance between two hold-down devices in the first plane is less than a second hold-down device distance between the two hold-down devices in the second and/or third plane. Alternative, the forming device advantageously has at least one hold-down device, which has a first extension in the first plane oriented transversely, in particular perpendicular, to the first direction, which first extension is smaller than a second extension of the hold-down device in the second and/or third plane oriented transversely, in particular perpendicularly, to the first direction. As a consequence, the distance of the hold-down devices and/or the ends of the width of the hold-down device advantageously changes/change in the course of the forming section, whereby the distance between the hold-down devices and/or the width of the hold-down device increases.

Advantageously, the hold-down device is mounted in a resilient manner, in particular relative to the shaping tool. In this manner, a particularly simple and gentle contacting of the material to be processed, in particular to be deformed or deflected, in particular of the semi-finished fiber product, can be realized.

Advantageously, the hold-down device is rotatably mounted around a first axis parallel to its longitudinal extension and/or the contact surface of the hold-down device, in particular its outermost exterior layer, consists of a material having a low coefficient of friction, in particular a coefficient of friction, in particular a static friction (pH), in particular with the semi-finished fiber product serving as reference point, of less than 0.8, in particular of a maximum value of 0.7, and/or more than 0.01, in particular of at least 0.03, in particular made of polyoxymethylene and/or polytetrafluoroethylene, for example Teflon, or the contact surface of the hold-down device is coated with polyoxymethylene and/or polytetrafluoroethylene, for example, with Teflon. The purpose of said coating is to minimize friction to the greatest extent possible, since the friction could exert a force acting against the feed motion direction and this can result in folds. In comparison, some prior-art rollers have a coating to achieve high friction in order to spread and stretch the material in a targeted manner or to push it forward and/or to pull it. An approach of this kind is, in particular, not pursued by means of the hold-down device according to the present invention.

Advantageously, a longitudinal extension of the at least one contact surface, which runs parallel to the first direction, has at least 60% of the extension of the forming section parallel to the first direction, wherein in particular the contact surface is continuous over at least 50% of the longitudinal extension. Advantageously, the contact surface is not part of a roller which only supports and drives the feed or the feed motion of the semi-finished fiber product and/or formed semi-finished fiber product, but rather extends not only over a small part of the length of the forming section or only over the width of the forming section, but rather over a substantial part, namely at least 60%, of the length of the forming section.

Advantageously, the at least one guiding area of the at least one shaping tool and/or the at least one shaping tool has a heating device and/or a cooling device, especially arranged on the side of the first guiding area facing away from the contact surface of the down-hold device and/or inside the shaping tool and/or its wall, in particular the wall, the delimitation of which forms the guiding area, and/or the at least one first guiding area of the at least one shaping tool can be heated and/or cooled. In this manner, advantageously, binding agents contained in the semi-finished fiber product may be activated in the forming section by the shaping tool, and/or their setting may be reduced, or the heat introduced due to friction may be dissipated.

Advantageously, the at least one shaping tool and/or the at least one guiding area in the first plane has a first transverse extension in the first plane, in particular parallel to the forming plane, and the at least one hold-down device, in particular all hold-down devices, and/or the at least one contact surface, in particular all contact surfaces, in the first plane, in particular those parallel to the forming plane, have a second transverse extension, wherein the first transverse extension is longer than the second transverse extension, in particular by at least 50% of the second transverse extension. Advantageously, the at least one shaping tool and/or the at least one guiding area, with its first transverse extension in the first plane, surrounds at least partially the second transverse extension, in particular, surrounds at least 80% of the second transverse extension, the at least one hold-down device and/or the at least one contact surface in the first plane and/or in the third plane.

Advantageously, the deflecting means and/or the at least one shaping tool, especially the infeed section and/or the at least one guiding area, especially an edge of the guiding area, has an infeed element.

The infeed element can be designed as one-piece with the guiding area and/or can be designed separately. It can be directly adjacent to the guiding area or be spaced at a distance from it, wherein it is arranged, in particular, between the supply device, especially at least one deflection means, and the guiding area. In particular, it is designed such that the semi-finished fiber product, across its width, must cover paths of different lengths as it passes through the infeed element and/or said semi-finished fiber product is so induced by the infeed element before reaching the guiding area, in particular, such that any difference in path length over the width of the semi-finished fiber product as it passes over the guiding area is compensated, at least partially, especially completely. For this purpose, in particular, it has different curvatures and/or radii over its extension perpendicular to the first direction and/or parallel to the width of the semi-finished fiber product. In particular, the infeed element has a spherical design and/or has at least one rounding, the surface lines of which are in the transport direction of the semi-finished fiber product over the infeed element and, in particular, are circular and/or elliptical arc sections, the axis of rotation or axes of rotation of which are arranged perpendicular to the pulling plane and through the centroid parallel to the width of the semi-finished fiber products during transport over the infeed element, deflection means and/or the beginning of the guiding area.

Alternatively and/or in addition, the infeed element can be designed such that over its longitudinal extension, it is arranged especially perpendicular to the first direction and/or parallel to the longitudinal extension of a deflecting means and/or parallel to the width of the semi-finished fiber product, such that it has different widths and/or is designed such that the contact length of the semi-finished fiber product with the infeed element is designed to be different over the width of the semi-finished fiber product, especially by decreasing outwards. Consequently, the infeed element can be designed with surface extensions that decrease outward over its longitudinal extension, for example.

Advantageously, the deflection means and/or the at least one shaping tool, in particular the infeed section and/or the at least one guiding area and/or the infeed element in an infeed plane parallel to or adjacent to the first plane, exhibits transversely, in particular perpendicular, to the infeed plane and parallel to the first direction, a curvature of a maximum of 1 rad, in particular of a maximum of 0.5 rad, in particular of a maximum of 0.1 rad, in particular of a maximum of 0.05 rad, wherein the first plane lies between the infeed plane and the second and/or third plane. Advantageously, the guiding area therefore exhibits a curvature at the beginning of the guiding area, wherein the curvature is preferably small, namely of a value under 0.5 rad.

Advantageously, the at least one contact surface and the at least one guiding area are designed such that the contact surface is smaller than the guiding area.

The object is solved as well by means of a system for the continuous production of fiber formed semi-finished products, especially endless ones. According to the present invention, the system has a supply device. In this context, the supply device supplies semi-finished fiber products. In particular, the supply device merely supplies the semi-finished fiber product, without pushing the semi-finished fiber product in the direction of further system devices according to the present invention. According to the present invention, the system also has a pulling device, in particular, positioned at the end of the system facing away from the supply device, by means of which the semi-finished fiber product is removed, in particular pulled, from the supply device. In the system according to the present invention, consequently, the semi-finished fiber product is pulled and not pushed through the system. Furthermore, the system according to the present invention has a forming device according to the present invention arranged between the supply device and the pulling device and has an introduction section arranged between the forming device and the supply device.

An advantage of the system according to the present invention is fact that, due to the pulling of the semi-finished fiber product through the forming device and due to the use of a forming device according to the present invention, the production of a semi-finished fiber product, in particular of an endless semi-finished fiber product, is more easily implemented, wherein the formation of folds or undulations is at least largely reduced during and by the passage of the semi-finished fiber product through the forming device.

All of the above-mentioned designs and their advantages with regard to the forming device according to the present invention can also be advantageously implemented within the system according to the present invention.

Advantageously, the introduction section has at least a first deflection means, in particular, a deflection roller and/or a deflection panel, to guide the removed semi-finished fiber product, wherein especially one, especially all, shortest connection vector(s) from the deflection means to the infeed end enclose(s) an angle to the first direction of less than or equal to 90°.

Advantageously, the infeed end, in particular its edge in or adjacent to an infeed plane perpendicular to the first plane, is convex and/or the deflection means, in particular its edge in and/or or adjacent to a deflection plane perpendicular to the first plane and/or parallel to the infeed plane is convex. Such a design of the infeed end and/or of the deflection means allows for especially simple prevention of the formation of folds, since in such a design, the guidance of the outer sides of the semi-finished fiber product and/or of the formed semi-finished fiber product takes place such that said product is apprehended and/or tightened by the infeed end and/or by the deflection means only at a later stage in the course of the guidance in the direction of the outfeed end, such that the semi-finished fiber product in the outer regions has and/or must take a shorter path from the deflection means to the infeed end, wherein this shorter path can be at least compensated in part by the deflection to the outfeed end, so that during pulling by the pulling device, the semi-finished fiber product is pulled as evenly as possible across its entire width behind the forming device. In this context, the advantage is that the tension applied by the forming is distributed as evenly as possible to the semi-finished fiber product, over the width of the semi-finished fiber product, in the direction of the feed motion. Consequently, it is preferred to design the device and/or the system and/or the method such that the path of the semi-finished fiber product, in particular through the device and/or the system, is constant over the width of the semi-finished fiber product. Since this is not the case over the forming section, it is preferred that the resulting difference in path lengths over the width is at least partially, in particular totally, compensated for in another section, in particular, in an upstream section.

Advantageously, at least one injection device and/or one impregnating device for the application of a binding agent, for example of a resin, is arranged upstream and/or downstream of the forming device and/or in the forming section. Advantageously, a curing device is arranged downstream of the injection device and/or impregnating device or at and/or downstream of the forming device and/or the forming section, in particular, upstream of the curing device. In the case of a semi-finished fiber product to which a binding agent has already been applied, an injection device and/or impregnating device is not required. In the system, therefore, a binding agent is advantageously added, in particular in the case of a non-pre-treated semi-finished fiber product or in case of a semi-finished fiber product without a binding agent contained therein, by means of an injection device and/or impregnating device, which binding agent subsequently is cured by means of the curing device, for example, such that the profile of the formed semi-finished fiber product formed by means of the forming device retains this shape and is stiffened therein.

According to the present invention, the object is solved as well by a method using a system according to the present invention and/or by a forming device according to the present invention.

According to the present invention, the object is solved as well by a method for forming a semi-finished fiber product. In this context, the semi-finished fiber product and/or the formed semi-finished fiber product is pulled, in particular by means of a pulling device, through a forming device having at least one hold-down device and at least one shaping tool. Before this, in particular, it is pulled and/or pulled off from a supply device. The forming device is, advantageously, a forming device according to the present invention, in particular, one in a system according to the present invention. Advantageously, the workpiece is pulled over the guiding area, in particular measured in the pulling direction, in particular in projection onto the guiding area and/or in the first and/or the second pulling plane, at least over a length of 10 cm of the guiding area adjacent to the guiding area. In this context, the guiding area has at least one concave section continuously arranged over the length of at least 10 cm.

According to the present invention, in the method according to the invention, a forming of the semi-finished fiber product is effectuated by deflection of the semi-finished fiber product while the semi-finished fiber product is pulled, by pulling it at least through one gap. According to the present invention, the gap is delimited by at least one first concave section of at least one first guiding area defined by the at least one shaping tool and by the at least one first contact surface of the hold-down device. Advantageously, when a forming device according to the present invention is used, the first concave section encloses the first concave cutting line section and the gap has the first, second, third and/or fourth length as the width, length or gap dimension of the gap.

In comparison to the methods previously in use, the semi-finished fiber and/or the formed semi-finished fiber product is not pushed, but rather, pulled, through the system. For this reason, some modifications of the forming device, of the system as well as of the method were needed. Furthermore, the pulling through the gap according to the present invention permits the production of an endless formed semi-finished fiber product, wherein the formation of folds can be prevented or reduced during the process and/or by the forming device.

Advantageously, the semi-finished fiber product is pulled over a convex section of the guiding area, in particular at one first end, in particular at one first end of the forming device facing the supply device. Advantageously, at least at the first end, the semi-finished fiber product is consequently pulled partially and/or temporarily over a concave section and partially over a convex section of the guiding area.

Advantageously, the gap exhibits a maximum height and/or a maximum distance between the guiding area and the hold-down device of at most 10 dm and/or the hold-down device and/or the guiding area and/or the shaping tool is/are set up such that the gap has a maximum height and/or a maximum distance between the guiding area and the hold-down of 10 dm at most.

Advantageously, in the method according to the present invention, the forming of the semi-finished fiber product into the formed semi-finished fiber product is carried out, at least partially, by deflection of the semi-finished fiber product during pulling of the semi-finished fiber product by pulling it through the at least one gap, wherein the semi-finished fiber product is pulled through a gap of a minimum height of 0.1 mm, in particular of at least 0.5 m.

Advantageously, a line, an imaginary line, in particular, is pulled across the width of the semi-finished fiber product, in particular, is pulled perpendicular to the longitudinal extension of the semi-finished fiber product or to the pulling direction and/or to the first direction and/or to the feed motion direction, is pulled simultaneously through the gap, and, consequently, in particular, is pulled through the concave section, and is pulled over the convex section, in particular, over at least 20 cm and/or over a minimum length corresponding to the width of the semi-finished fiber product.

Advantageously, a first, in particular, central section and/or a section adjacent to the central point of the width, is pulled over the width of the semi-finished fiber product from a first forming plane into a second forming plane which is truly parallel to the first forming plane. Advantageously, a second section of the line is additionally guided over the width of the semi-finished fiber product, in particular, exclusively at the same time, into the first forming plane. Advantageously, such a first section has, in particular, a width of at least 5%, in particular, of at least 10%, of the width of the semi-finished fiber product in the first forming plane. Advantageously, in particular, the distance of the second forming plane from the first forming plane is increased during the passage over the forming device and/or a distance measured perpendicularly to the extension of the first and/or the second section of the line being between the first section of the line over the width and the second section of the line over the width is increased during the passage over the forming device. Advantageously, the first forming plane extends horizontal and/or parallel to the longitudinal extension of the forming device and/or parallel to a vector from the starting point, [i.e.,] the end nearest the supply device, the forming device or the gap, to the end, [i.e.,] the end nearest the pulling device, the forming device or the gap.

Advantageously, the starting and/or end point of the first and/or second section on the line over the width of the semi-finished fiber product changes during the passage of the semi-finished fiber product through the forming device.

Advantageously, in addition to the first and second section, a third section of the line is present over the width of the semi-finished fiber product, wherein the third section, in particular its length over the width of the semi-finished fiber product, is increased during the passage of the semi-finished fiber product over the forming device, in particular, and due to the forming device. Advantageously, the third section is not in the first forming plane and/or not in the second forming plane and/or the third section is directly adjacent to the first and/or the second section. For example, in an Omega (Ω) profile, the two lower, outer legs represent the second section, while the central, upper section represents the first section and the two connecting sections connecting the legs to the superior section represent the third section. For example, during the passage of an initially flat semi-finished fiber product, the central region/first section is lifted from a first into a second forming plane by means of two gaps; during the passage, the central region/the first section is pulled and lifted farther away from the first forming plane/the second section, such that the intermediate region/third section, being between the centrale region and the leg, is enlarged. The same applies to the other profiles, such as a L, Z, or U profile.

Advantageously, a first section, in particular, a central section and/or section adjacent to the center of the width of a line across the width of the semi-finished fiber product is pulled during the passage over the forming device in a first pulling plane (in particular, a first plane of the shaping tool, in particular, of the guiding area) over which the semi-finished fiber product is pulled), and a second section is pulled in a second pulling plane (in particular, in a second plane of the shaping tool, in particular, of the guiding area) over which the semi-finished fiber product is pulled), wherein the first and the second pulling planes intersect in a cutting line forming a cutting angle greater than 0°, in particular, greater than 5°, and less than 90°, in particular, less than 80°, wherein the cutting line extends, in particular, over only part of the width of the semi-finished fiber product. In this context, in particular, the first forming plane does not correspond to the first pulling plane.

Advantageously, the semi-finished fiber product is deflected during translation along the gap transverse to the first direction in a region behind a first end of the forming device facing toward the supply device. In comparison to the prior-art methods applied up to now, the material therefore is not folded over or is not folded over by a flank of the guiding area, but rather, it is continuously deflected, in particular.

The semi-finished fiber product is advantageously pulled over a ramp formed by the guiding area, in particular, the first section. In this context, in particular, the first section is pulled from the first forming plane along the first pulling plane into the second forming plane.

Advantageously, the semi-finished fiber product is heated and/or cooled by means of the contact surface and/or the shaping tool, and/or a binding agent in the semi-finished fiber product is activated and/or the effect of which binding agent, in particular, its rigidity or activity, is influenced. In particular, the semi-finished fiber product is heated before processing, in particular, deflection, in the forming device and/or before curing, in particular in a curing device, and after the processing, in particular deflection, in the forming device. In particular, the formed semi-finished fiber product is cooled after the processing, in particular after its deflection, in the forming device and/or after the heating, in particular, by means of the contact surface and/or the shaping tool, and/or is cooled after the curing, in particular, in a curing device.

In particular, this is carried out such that the semi-finished fiber product is influenced so to be formable on the forming device. In the case of semi-finished fiber products with thermoplastics, for example, it can be useful to heat them before and on the forming device, in particular, at the beginning of the forming device. It can also be useful to (re)reduce the plasticity after forming, for example, by cooling a thermoplastic or by curing a binding agent, for example, by heating and/or by UV irradiation. Consequently, it can also be useful to cool a semi-finished fiber product of the formed fiber product having the thermoplastics after passage through the forming device and/or after the completion of a passage through the forming device.

Advantageously, the semi-finished fiber product is guided by means of at least one deflection means arranged between the supply device and the forming device such that over the width of the semi-finished fiber product, the paths of the semi-finished fiber product being between the supply device and the end of the forming device facing away from the supply device are at least partially adjusted, in particular, entirely adjusted, and/or are constant over the width, in particular, all paths over the width of the semi-finished fiber product. For example, this can take place by means of a deflection means, the edge of which is designed proportionally to the profile, in particular, by means of a deflection means according to the present invention and the convex design thereof, and/or by means of an infeed end according to the present invention and the convex design thereof. Other options are conceivable for the person skilled in the art, such as, for example, additional rollers or elevations, for example, at the infeed end of the shaping tool, or additional further deflection means. The advantage here is that the tension applied by the forming is distributed as evenly as possible on the semi-finished fiber product, across the width of the semi-finished fiber product, in the direction of the feed motion.

Advantageously, the semi-finished fiber product and/or the formed semi-finished fiber product is deflected and/or deformed by the forming device by means of tensile forces transverse to the first direction in the forming device, in particular, in planes between the first and the second plane and parallel to the first and to the second planes. The advantage of the forming device according to the present invention, the system according to the present invention and the method according to the present invention, is that the tensile forces transverse to the feed motion direction and/or the continuous forming reduce/prevent the formation of undulations and folds in each section during the forming by the forming process.

Advantageously, after the forming and/or the deflection, the semi-finished fiber product and/or formed semi-finished fiber product is stiffened, in the form deflected by the forming device, inside the forming device by means of a curing device arranged between the pulling and the forming device.

Advantageously, the pulling device exclusively pulls the semi-finished fiber product through the forming device from rigid, in particular, bend-proof sections of the semi-finished fiber product, in particular, of the formed semi-finished fiber product, in particular, a section of the semi-finished fiber product stiffened by means of a curing device, in particular, one according to the present invention, and/or the formed semi-finished fiber product produced thereby.

Advantageously, the semi-finished fiber product and/or formed semi-finished fiber product is cured after having been deformed and/or deflected inside the forming device, and/or a binding agent, for example a resin, is applied to said product before its forming and/or deflection in the forming device and/or before curing, in particular, by means of an injection device, in particular, the injection device according to the present invention and/or by means of an impregnation device, in particular, the impregnation device according to the present invention, which is arranged, in particular, between the forming device and the supply device. Advantageously, after the forming and/or deflection in the forming device and/or after the impregnation and/or injection with binding agent, [the latter taking place] especially in the injection device and/or impregnation device, the semi-finished fiber product is cured, especially in a curing device, which is arranged, in particular, between the forming device, especially the injection device and/or the impregnation device, and pulling device.

The object is solved as well by a method for forming a semi-finished fiber product and/or for forming a formed semi-finished fiber product whereby the semi-finished fiber product is pulled through a forming device, in particular a forming device according to the present invention, whereby the fiber material is processed inside the forming device by means of at least one elongated hold-down device and by at least one shaping tool, whereby the semi-finished fiber product is pulled along and/or parallel to a longitudinal axis of the hold-down device, and whereby the semi-finished fiber product is pulled along and/or parallel to a gap formed between a concave area of the shaping tool, in particular a guiding area defined by the shaping tool, and the contact surface of the hold-down device.

The forming device according to the present invention, the system according to the present invention and the method according to the present invention claim various arrangements, partly defined by reference to different planes, including—by means of advantageous embodiments, if applicable—the first, the second, the third plane, the first and the second forming plane, the infeed plane as well as the first and the second pulling plane. With regard to these planes, they are presumed, in principle, to be mathematical planes in three-dimensional space, being consequently without any limitation in two spatial directions, whereby said planes are primarily only imaginary planes and not structural components forming a plane.

The first, the second and/or the third plane extend through the forming device and the forming section in a manner which is similar to a cutting plane. According to the present invention and inherently, the guiding area has a width, a length, and a height, whereby the height of the guiding area extends along the first and second, in particular also along the third plane, and the height of the guiding area in the first plane at the height of the first plane is smaller than the height of the guiding area in the second plane at the height of the second plane. Apart from the height, also the width of the guiding area extends in the first and the second, and in particular, also in the third plane. In particular, the orientation of the first, the second and/or the third plane is selected such that the shortest extension and/or all shortest extensions of the guiding area, which lie parallel to the width of the semi-finished fiber product and which pass through a point of the respective plane, lie fully in this plane and/or the first, the second and/or the third plane lies parallel to the width of the semi-finished fiber product and/or perpendicular to the first direction.

The semi-finished fiber product is, in particular, a semi-finished fiber product having a width of at least 1 m, in particular, of at least 1.2 m, and/or of a maximum of 5 m, in particular, a maximum of 3 m.

Advantageously, the shaping tool and/or the hold-down device is made of metal, carbon fiber-reinforced plastic and/or glass fiber-reinforced plastic, polytetrafluoroethylene, polyoxymethylene, wood and/or of a mixture of the above-mentioned materials.

Advantageously, the method is carried out and/or the device or the system is set up such that the workpiece, the formed semi-finished fiber product and/or the semi-finished fiber product has at least two fiber layers arranged one on the top of another, wherein the fibers of the at least two fiber layers exhibit at least two different directions of extension in length and wherein the two different directions of extension in length enclose an angle in the range between 30 and 150°, in particular, in the range between 40 and 160°. In particular, the workpiece and/or the semi-finished fiber product has at least two semi-finished formed fiber products arranged one on the top of another.

In particular, the device according to the present invention and/or the system according to the present invention is set up for executing the process.

The object is also solved by a workpiece consisting of a formed semi-finished fiber product cured with binding agents, wherein the workpiece, the formed semi-finished fiber product and/or the semi-finished fiber product have at least two fiber layers arranged one on the top of another. In particular, the workpiece has at least two semi-finished fiber products arranged one on top of another.

The fibers of the at least two fiber layers preferably have at least two different directions of longitudinal extension, wherein the two different directions of longitudinal extension, in particular, enclose an angle in the range from 30 to 150°, in particular in the range from 40 to 160°. In this context, there can be at least two layers with oriented fibers or at least one layer with tangled fiber layers. Alternatively, at least one direction of longitudinal extension, in particular, that of a layer with directions of longitudinal extension oriented at an angle in the range from 30 to 150°, in particular in the range from 40 to 160°, to the longitudinal extension of the workpiece and/or to the direction in which it was pultruded and/or in which it was pulled during the forming. In this context, the workpiece has a length of at least 0.5 m, in particular of at least 1 m, to the longitudinal extension of the workpiece and/or to the direction in which it was pultruded and/or in which it was pulled during the forming.

According to the present invention, in all transverse cross-sections over the transversal length, in particular perpendicular to the length, the workpiece has at least one curvature, in particular, a curvature of the semi-finished fiber product, in particular, of the at least two layers, in particular, at least of one part of the fibers of the fiber layers. In this context, in particular, the fibers exhibit at least one, in particular at least two, directions of longitudinal extension of at least one, in particular, at least two, layer(s), a curvature, in particular, of at least 30°, in particular of at least 45°, in particular perpendicular to the longitudinal extension of the workpiece and/or to the direction in which it was pultruded and/or in which it was pulled during the forming.

In this context, the fiber layers and/or the semi-finished fiber products preferably exhibit an undulation smaller than is specified in the following, which also comprises no undulation, and/or the respective fiber layers are arranged parallel to one another.

The maximum undulation height of a fiber layer of the workpiece is a maximum of a quarter of the workpiece thickness or of the workpiece wall thickness present in the undulation region, measured in particular in the direction of the displacement of the undulation, and/or the maximum height of an undulation, also undulation height, of a fiber layer of the workpiece is a maximum of 15% of the width of the undulation, in particular, measured perpendicular to the height.

The undulation height is measured, in particular, in the direction of the thickness of the workpiece or of the wall. In particular, the undulation width is measured perpendicular to it. The undulation width is given, in particular, by the distance between the points on the imaginary non-undulated fiber layer at which the course of the undulated fiber layer differs from the imaginary non-undulated fiber layer. The undulation height is given in particular by the maximum distance existing between the undulated fiber layer and the imagined and not-undulated fiber layer.

The undulation width and/or height are determined, in particular, according to the description in connection with FIGS. 6 and 8.

Advantageously, the workpiece, the formed semi-finished fiber product and/or the at least one semi-finished fiber product has at least three, in particular, at least four, fiber layers and/or the at least two fiber layers exhibit at least three, in particular four, different directions of longitudinal extension, in particular, at least two, in particular, at least three pairs of directions of longitudinal extension, which pairs respectively enclose an angle in the range from 30 to 150°, in particular in the range from 40 to 160°.

Advantageously, the workpiece exhibits a fiber content in the range from 40 to 75 Vol % relative to the workpiece, in particular, relative to the workpiece formed by the fiber and the binding agent, or relative to the part formed by the fiber and the binding agent, and/or the workpiece and/or this part exhibit(s) a thickness in the range from 1 to 60 mm. The device is advantageously set up for producing such a workpiece and/or the method is performed to produce such a workpiece.

In particular, the workpiece is produced by means of the method according to the present invention and/or has properties described as advantageous.

The features, including the advantageous features, according to the invention that are described with regard to the forming device, the system and/or the method, may be transferred to the forming device, to the system or to the method, to the extent possible for the person skilled in the art. The disclosed features of the forming device according to the present invention are consequently also transferable to the method or to the system, and the disclosed features of the system according to the present invention are also transferable to the method or to the forming device, or the disclosed features of the method according to the present invention are also transferable to the system or to the forming device.

BRIEF DESCRIPTION OF THE SEVERAL VIEWS OF THE DRAWINGS

Further advantages and features of the invention are apparent by way of example from the description below of an exemplary embodiment, based on the attached figures, which are purely schematic. They show.

The figures are purely schematic, and their representation is limited to components which are important for the understanding of the present invention.

In the figures, the same elements are indicated with the same reference symbols.

DETAILED DESCRIPTION

Figure 1:
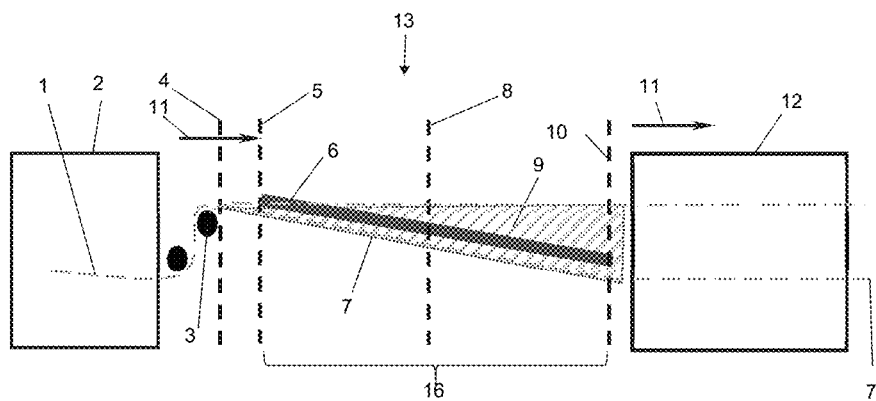
FIG. 1 a schematic representation of a system according to the present invention with a forming device according to the present invention, using the method according to the present invention, FIG. 2 a perspective representation of the forming device according to the present invention as well as a profile section through the same with the semi-finished fiber product positioned therein, FIG. 3 a profile section through forming devices according to the present invention with three different advantageous embodiments of the hold-down devices, FIG. 4 a profile section through a forming device according to the present invention having an inclined flank in the shaping tool and its guiding area, FIG. 5 a top and a side view of a forming device according to the present invention, FIG. 6 an illustration of the quantification of the undulation, FIG. 7 an illustration of exemplary undulations, FIG. 8 an illustration of the quantification of the undulation in a curved workpiece section, FIG. 9 an illustration of exemplary undulations, undulation in a curved workpiece section, as well as FIG. 10 a top view of a forming device according to the present invention exhibiting two parallel surfaces respectively exhibiting a torsion.

In FIG. 1, the system according to the present invention is exhibited in a purely schematic way with a forming device 13 according to the present invention by using the method according to the present invention. In this Figure, and in the subsequent FIGS. 1 to 5, the system, the forming device 13 and the method are exhibited by using an exemplary embodiment for an omega shape of a formed semi-finished fiber product.

In this Figure, a semi-finished fiber product 1 is pulled from the left to the right, from the right. For this purpose, the semi-finished fiber product 1 is pulled from a supply device 2 by means of a pulling device 12, which is arranged at the end of the system's processing section. The semi-finished fiber product 1 is only pulled and conveyed by the pulling device 12 by pulling on the semi-finished fiber product and/or workpiece through the whole system processing section. In this context, the supply device 2 advantageously provides an endless semi-finished fiber product 1 or alternatively (not shown) sections of the semi-finished fiber product 1 are provided by means of the supply device 2, which sections are connected, for example sewn, to an endless semi-finished fiber product downstream of the supply device 2 and upstream of the forming device 13. In the exemplary embodiment exhibited in FIG. 1, the semi-finished fiber product 1 is pulled by means of a deflection means 3, for example by a deflection roller, into the forming device 13 arranged between the supply device 2 and the pulling device 12 with aid of the pulling device 12.

The semi-finished fiber product 1 reaches the forming device 13 in an infeed plane 4 with a direction of movement in the direction of a first direction 11, a feed motion direction of the semi-finished fiber product 1 in this section of the system. The semi-finished fiber product 1 is pulled over a front-end starting edge of a shaping tool 7 of the forming device 12. The shaping tool 7, which can be made in one piece or can alternatively consist of several shaping tool parts, forms a guiding area 9 for the semi-finished fiber product 1, whereby for this reason the guiding area 9 is defined by the expansions of the shaping tool 7 or of all shaping tool parts. The expansion is not clearly apparent in FIG. 1. For details, reference is made to the following FIG. 2.

Furthermore, the forming device 13 has two hold-down devices 6, which, with their longitudinal extension, extend over at least one part of the forming device 13. The hold-down devices 6 advantageously fix the semi-finished fiber product 1 locally, i.e. merely in regions of the semi-finished fiber product 1 which are small in relation to the guiding area 9. The hold-down devices 6 respectively have a contact surface at least partially on their outer side, in particular on the outer side facing the semi-finished fiber product 1. With this contact surface, the hold-down devices contact two regions of the semi-finished fiber product 1 and restrict it locally in its freedom of movement. In this context, the hold-down devices 6 can respectively extend over a same total length—for example, at an angle to the horizontal, as shown in FIG. 1—as the shaping tool 7 or the guiding area 9. However, it is also possible that the hold-down devices 6 extend over a shorter or over a longer distance than the guiding area 9 or the shaping tool 7. As shown in the schematic illustration from FIG. 1, generally speaking, the hold-down devices 6 essentially extend merely over their longitudinal extension. Conversely, the guiding area 9 extends both in its longitudinal extension and along the height of the system, i.e., both horizontally and at an angle to the horizontal, and consequently spans the height in the course of the system within the forming device 13. The shaping tools 7 are arranged such that they and/or the guiding area 9 approximately reflect the desired shape of the formed semi-finished fiber product, in this exemplary embodiment exhibiting an omega shape.

Figure 5:
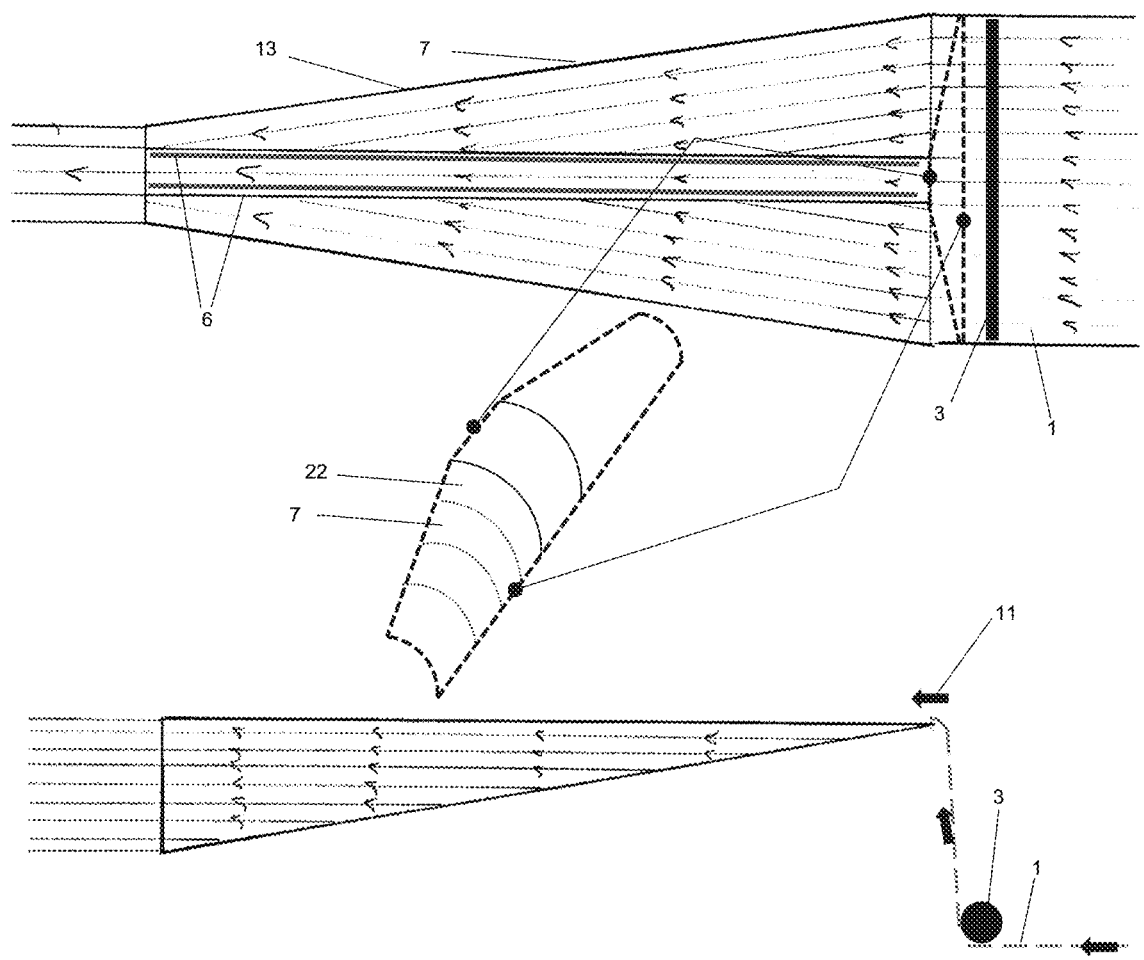

Due to the arrangement of the deflection means 3 at the same height as, or slightly below, the arrangement of the front-end edge closest to the supply device 2, the semi-finished fiber product 1 is pulled over this edge into the forming device 13 and the forming section 16. An advantageous design of this edge is shown in FIG. 5.

In a first plane 5, which may coincide with the infeed plane 4 or may be displaced in the direction of the pulling device 12, the hold-down devices 6 and the shaping tool 7 are arranged such that the contact surface of the first hold-down device and that of the second hold-down device, respectively together with the guiding area 9, form a gap through which the semi-finished fiber product 1 is pulled. In this context, the first plane 5 extends perpendicular to the pulling plane of the schematic representation from FIG. 1. However, it is also possible to use a different imaginary first plane; however, the prerequisite for the first plane is that the first direction does not lie in this plane and/or that the semi-finished fiber product 1 is not pulled along or into this plane, but rather lies transversely to this direction. As will be better apparent in the following figures, the guiding area 9 has two concave cutting line sections 14 in the first plane 5. These gaps and concave cutting line sections 14 are also present in a second plane 10, being parallel to first plane 5, but displaced in the direction of the first direction 5 and in the direction of the pulling device 12. In particular, a second plane at the end of the hold-down device 6, or of the shaping tool 7 or the guiding area 9, is considered. In such a second plane 10, a forming section 16 extends from the first plane 5 to the second plane 10, in which forming section 16 the semi-finished fiber product 1 is processed, in particular, formed and deflected, in the forming device 13 by means of the gap and/or of the concave cutting line sections 14. At the end, especially the end closest to and facing toward the pulling device, of the gaps, which are formed by the guiding area 9 and the hold-down device 6, or by the guiding area 9 or the hold-down devices, there is the outfeed end, by which the semi-finished fiber product 1 is deflected for the last time by the forming device 13, in particular, by the guiding area 9 and/or the contact surface.

In addition, it should be noted that the course of a central section of the width of the semi-finished fiber product 1, extending perpendicular to the pulling plane, at least at the infeed plane 4, is shown as a dashed line in FIG. 1. Other sections extend, at least outside the infeed plane 4, partly deviating, for example, in the pulling plane and perpendicular to the pulling plane, for example, on the dash-dotted line, as will become evident from the following figures.

Figure 2:
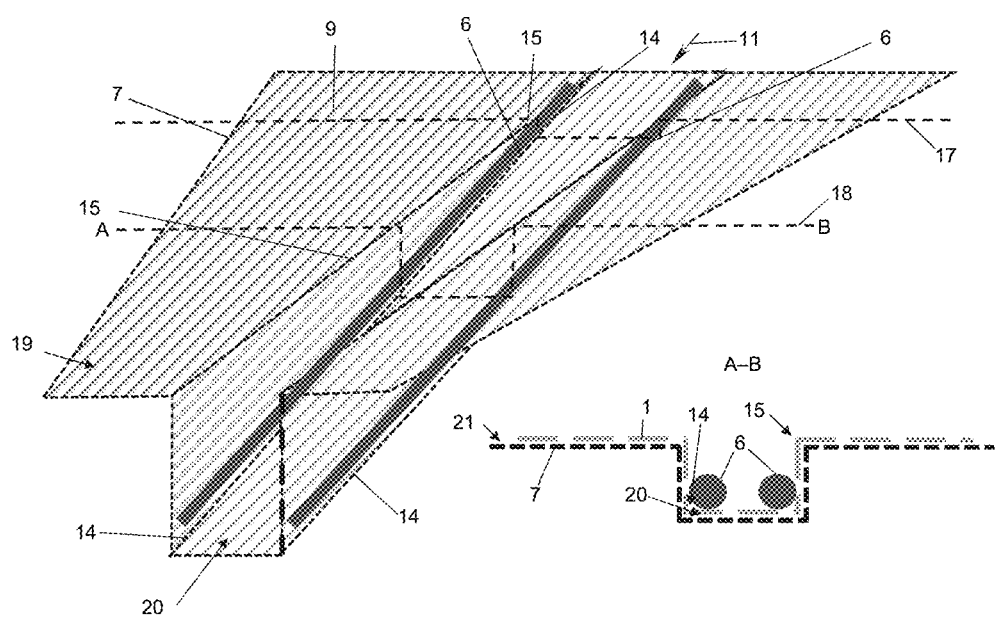

FIG. 2 shows a perspective representation of the forming device 13 according to the present invention (on the left) and a section through it (at the bottom right), as used in FIG. 1. By means of the forming device 13, a so-called negative forming is enabled, whereby the guiding area 9 depicts the negative of the desired shape. In such a forming device 13, the semi-finished fiber product 1, shown here only in its sectional view, as shown in the representation from FIG. 1, is pulled from above by means of the first direction 11 into and through the forming device 13 by means of the pulling device 12. In this context, the guiding area 9 resembles a "downward" ramp, i.e., a ramp from a first forming plane 21 into a second forming plane arranged below the first forming plane and parallel to it. The semi-finished fiber product 1, for example, extends at the beginning of the forming section 16 of the forming device 13 over the whole width of the guiding area 9—consequently over a large horizontal width. In the further course of the forming device 13 within the forming section 16, a first section, i.e., the central section, of the semi-finished fiber product 1 is pulled through the hold-down devices 6 and their contact surface as well as through a part of the guiding area 9, i.e., through the gaps and the concave cutting line sections 14, from this first forming plane 21—downward—into the second forming plane along a second pulling plane 20. A second, i.e. the outer, section of the semi-finished fiber product 1 continues to be pulled in the first forming plane 21 along a first pulling plane 19. The first forming plane consequently corresponds to the first pulling plane 19, whereby the second pulling plane 20 is arranged at an angle to the first pulling plane and consequently, also to the first and second forming plane, so to form the ramp. A further, third section, between the first, central, and the second, outer, section, is deflected perpendicularly, i.e., due to a second, i.e., a convex cutting line section 15, in interaction with the concave cutting line section 14. In this context, the convex section line section 14 is not formed by or at one of the gaps or the hold-down devices 6, but rather results from the shape of the guiding area 9. Corresponding to the shape of the guiding area and, in particular, that of the convex cutting line section 15, the vertical fold shown in the figure or another, for example blunter, deflection, can be realized. The length of the third section increases in the course of the forming in the forming section 16, whereby the length of the first section in this exemplary embodiment of a forming device 13 according to the invention remains constant during the forming. However, with regard to a desired shape of the formed semi-finished fiber product, which is to have an inclined flank (third section), for example, it is also possible that at least the longitudinal extension of one of the hold-down devices 6 extends in an angle, i.e. obliquely and not parallel, relative to the angle of the other hold-down device 6 and/or of the gap formed by, inter alia, the other hold-down device 6. In such a configuration, it is preferred for the length of the first section to increase during the forming.

Figure 4:
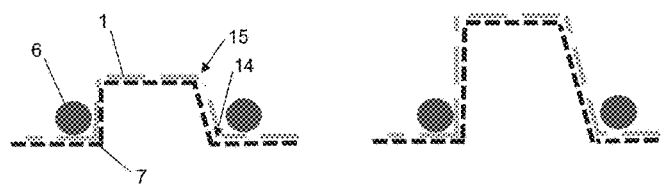

Such a configuration of the shaping device 13 with inclined flank is shown, for example, in the cross-sectional representations in the illustrations of FIG. 4. Here the right flank of the guiding area 9 defined by the shaping tool 7 has an inclined flank. Regardless of the arrangement of the hold-down devices 6 to one another, the length of the second, i.e. in this context of the outer section, is reduced, at least, however, due to the extension of the length of the third section over the length of the forming device (in the section, only evident by comparing the two sections from FIG. 4). A cutting line through the guiding area 9 in a plane parallel to the first plane 5 is shown by the cutting line 17 (on the left in FIG. 4) and the cutting line 18 (on the right in FIG. 4) (arranged in the longitudinal direction as shown in FIG. 2 on the forming device from FIG. 2), by which the extension of the third section can be clearly seen in comparison.

Furthermore, in the illustration of FIG. 2, a cross section along the profile AB and the cutting line 18 is shown, whereby a semi-finished fiber product 1 is also shown in this representation. It is apparent that the semi-finished fiber product 1 does not, with its width, extend over the entire width of the guiding area 9, since the second section of the semi-finished fiber product 1 has already shortened. In this exemplary embodiment, the width of the shaping tool 7 and consequently, the contour of the guiding area 9, are therefore not completely adapted to the forming and the resulting change in width of the semi-finished fiber product 1 in the course of the forming process. However, it is conceivable that such an adaptation take place with a precise fit in order to provide a forming device which is as space-saving as possible. Furthermore, the concave cutting line sections 14 of the guiding area 9 of the shaping tool 7, and the gaps, respectively delimited by the contact surface of one of the hold-down devices 6, together with the guiding area 9 of the shaping tool 7, are apparent. Through these concave cutting line sections 14 and gaps, the first, central section of the semi-finished fiber product is pulled downward into a plane different from the first forming plane 21 and parallel to it. Due to the convex cutting line section 15 of the guiding area, the second section of the semi-finished fiber product continues to be pulled in the first forming plane 21 along the first pulling plane 19, by which means the third section of the semi-finished fiber product is formed. In the present exemplary embodiment of the shaping device 13, this third section is perpendicular to the first and second sections, and the two third sections are arranged parallel to one another. However, other shape designs of the guiding area are also possible, which in the present example corresponds to a negative of an inverted Omega shape.

Figure 3:
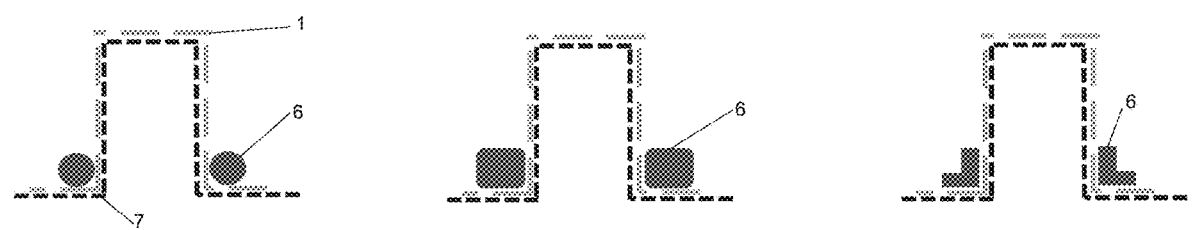

In FIG. 3, three different exemplary shape designs of the hold-down devices 6 are shown in a cross-sectional view through the guiding area 9 parallel to the first plane 5. Different from the representations in FIGS. 1 and 2, this representation concerns a forming device for a positive forming. Consequently, together with its guiding area 9, the shaping tool 7 forms the positive of the desired shape of the formed semi-finished fiber product. The hold-down devices 6 can consequently have a round shape, on the one hand, for example, that of a rod. Furthermore, it is conceivable that a cuboid hold-down device—as exhibited in the central illustration of FIG. 3—may be used. In this context, it should be noted that in this exemplary embodiment, the edges of the cuboid are rounded, such that the semi-finished fiber product 1 is not damaged by the hold-down devices 6 or during the passage of the semi-finished fiber product 1 through the gap formed thereby. An embodiment having an "L"-shape for the hold-down device 6—as shown in the illustration on the right in FIG. 3—is conceivable as well. These and further, other shapes of a hold-down device 6 are possible for both negative and positive forming, provided that with them, at least a local restriction of the movement of the semi-finished fiber product 1 and/or the formation of a gap, especially in a concave cutting line section 14 of the guiding area 9, can be realized. As is apparent from the illustrations of FIG. 3, it is crucial that the hold-down devices 6 are positioned such that in the region in which the concave cutting line section 14 lies, said hold-down devices 6 act on or engage the semi-finished fiber product 1, especially on the other side, which is not contacted by the guiding area 9. An advantage of a round design, i.e., for example, a rod shape, is evident in that such a rod can be arranged so as to be mounted rotatably around its longitudinal axis, whereby additional but controllable and targeted force can be applied to the semi-finished fiber product 1 transversely to the feed motion direction, to the first direction 11, and consequently forces transverse thereto and transverse to the feed motion direction at the location of the hold-down device can also be applied to the semi-finished fiber product, which forces help prevent the formation of folds and promote a clean forming process. This is, for example, possible by pressing the hold-down device onto the semi-finished fiber product. Furthermore, the forces and their strength may be selected through the pressure force and direction, and thereby the forming result can be optimized. However, in order to ensure a simple and, in particular, a damage-free passage and deflection of the semi-finished fiber product 1 through forming device 13, it is provided, in particular, that the contact surface of the hold-down devices 6 be provided with a material or to be made of such a material that has a low coefficient of friction relative to the selected semi-finished fiber product 1, such as POM or PTFE (e.g., Teflon) material.

In the illustrations of FIG. 5, the upper illustration shows a top view of an exemplary embodiment of a shaping device 13 according to the present invention. In this illustration, a semi-finished fiber product 1 is pulled from the right to the left, indicated by the arrows on the semi-finished fiber product 1. The lower illustration in FIG. 5 exhibits a lateral view of the above top view while middle illustration shows a perspective view of the infeed element 22 of the shaping tool 7. The semi-finished fiber product 1 is pulled onto the infeed element 22 of the shaping tool 7 by means of the deflection means 3. In the detailed illustration, this infeed element 22 of the shaping tool 7 is shown magnified. The lower edge of the infeed element is designed in a straight line. The starting edge bulges to varying extents in different regions (emphasized by dashed lines) from the lower edge in the direction of the upper edge of the infeed element. The central region (between the two solid lines) of the infeed element 22 has a curvature section having the shape of a circular section with constant radius over the width of the infeed element (between the solid lines), wherein the central region transitions to a region exhibiting a stronger curvature toward the outer regions. The length of the surface of the infeed element 22 is decreases respectively toward the outer region as well (also evident by the solid and dashed curvature lines).

In the further course, the semi-finished fiber product 1 is deflected by means of the gap which is defined by the hold-down devices 6 and the guiding area 9, which is formed by the shaping tool 7, and guided into the respective shape, here, the Omega shape. Due to the extension of the third section of the semi-finished fiber product 1—as shown and explained in the illustration of FIG. 2—part of the semi-finished fiber product 1 initially runs as the second section of the semi-finished fiber product and consequently then runs in the first forming plane, whereby, however, in the further course, said part merges into the third section. To prevent the formation of any resulting folds or undulations in this manner, the infeed element 22 of the shaping tool 7 was designed as shown in the detailed illustration. Due to the shape of the infeed element 22, the semi-finished fiber product 1, over its entire width, traverses the same, i.e., a constant, path length along the entire forming device 13 and along the forming section 16. These paths are illustrated by the lines with arrows. They appear to be of different lengths in the top view shown, however, if viewed from a three-dimensional perspective, they are identical and constant across the width of the semi-finished fiber product.

Figure 6:
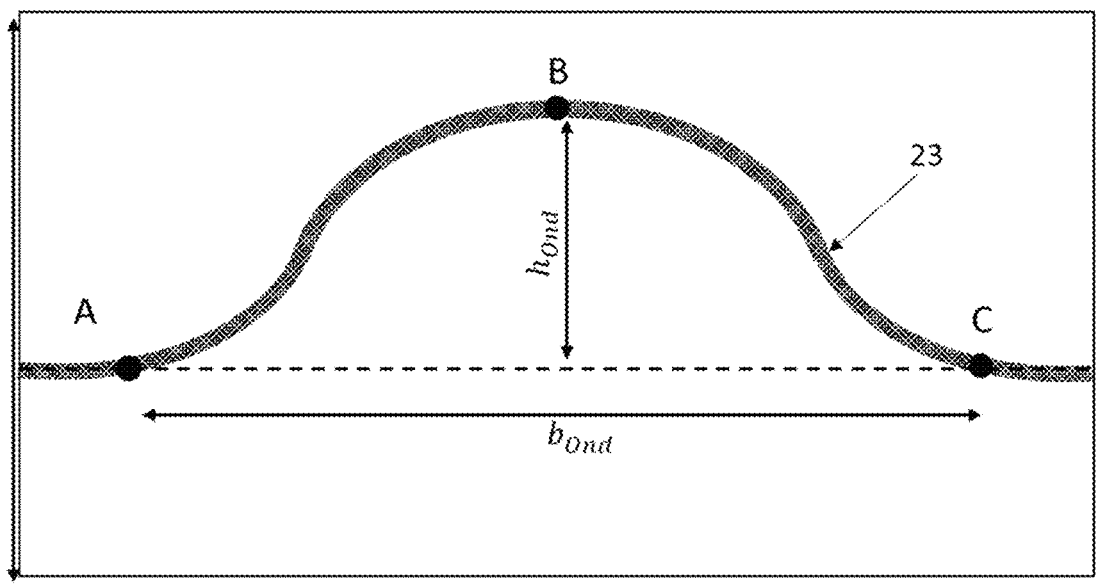

FIG. 6 shows an illustration of the quantification of an undulation of a fiber layer 23. The workpiece section drawn as a rectangle, through which a section is shown, consists of a plurality of fiber layers fixed in resin, only one of which is shown. The thickness of the workpiece is marked on the left by a double arrow. The workpiece runs longitudinally from the left to the right, and apart from undulations, the fiber layers also extend horizontally. The fiber layer shown has an undulation. Also shown are:

tBT as component thickness
hOnd as undulation height
bOnd as the undulation width between points A and C.

Point A and point C are given by the points on the imaginary non-undulated fiber layer, here the horizontal course, indicated by the dashed line along which points the course of the undulating fiber layer deviates from the imaginary non-undulated fiber layer.

Preferably $$\left|\frac{h_{Ond}}{t_{BT}}\right| \leq 0.25$$

and/or $$\left|\frac{h_{Ond}}{b_{Ond}}\right| \leq 0.15.$$

Figure 7:
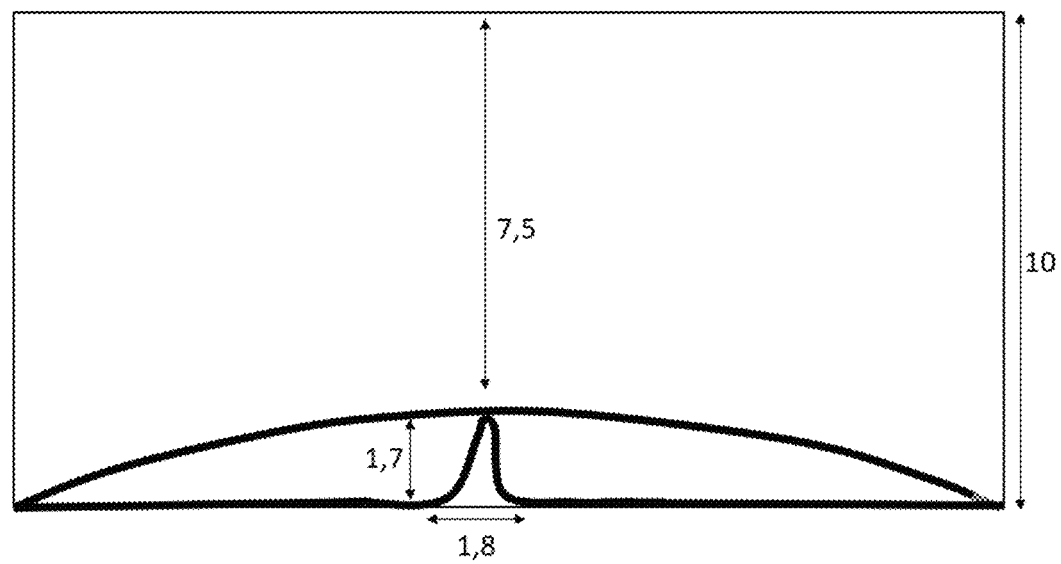

FIG. 7 illustrates an undulation satisfying these two requirements, namely the elongated one in the figure and an undulation that does not satisfy the second requirement.

Figure 8:
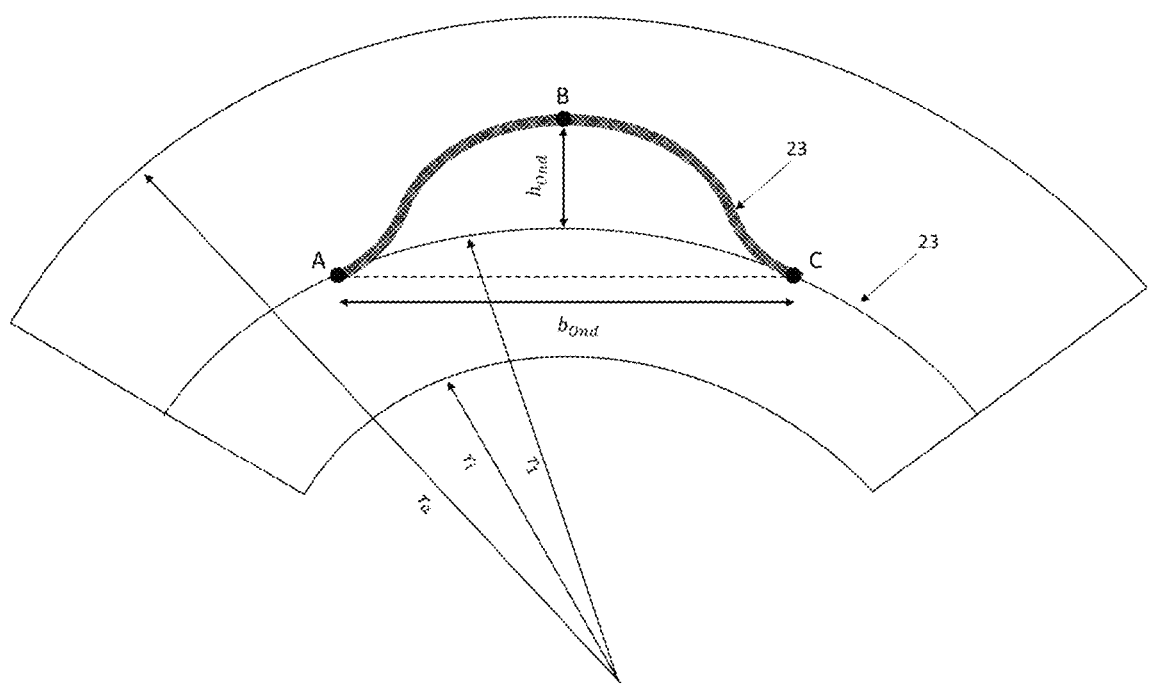

FIG. 8 illustrates the quantification from FIG. 6 on a curved workpiece section. The undulation height $h_{Ond}$ is described by the distance of the circular arc (of the radius r1) of the imaginary non-undulated course of the undulated single layer to point B, which is given by the maximally deflected point of the undulation, the perpendicular distance of which to the circular arc line of the imaginary non-undulated fiber layer is normalized the greatest.

$b_{Ond}$ is formed by the chord between the points A and C. The points A and C are given by the points on the imaginary, non-undulated fiber layer (thin circular section) at which the course of the undulated fiber layer, which is shown as thicker in the undulated region, deviates from the imaginary, non-undulated region. The above-mentioned preferred limits may then also be expressed as follows:

$$\left|\frac{h_{Ond}}{r_a - r_i}\right| \leq 0.25$$

and/or $$\left|\frac{h_{Ond}}{b_{Ond}}\right| \leq 0.15$$

Figure 9:
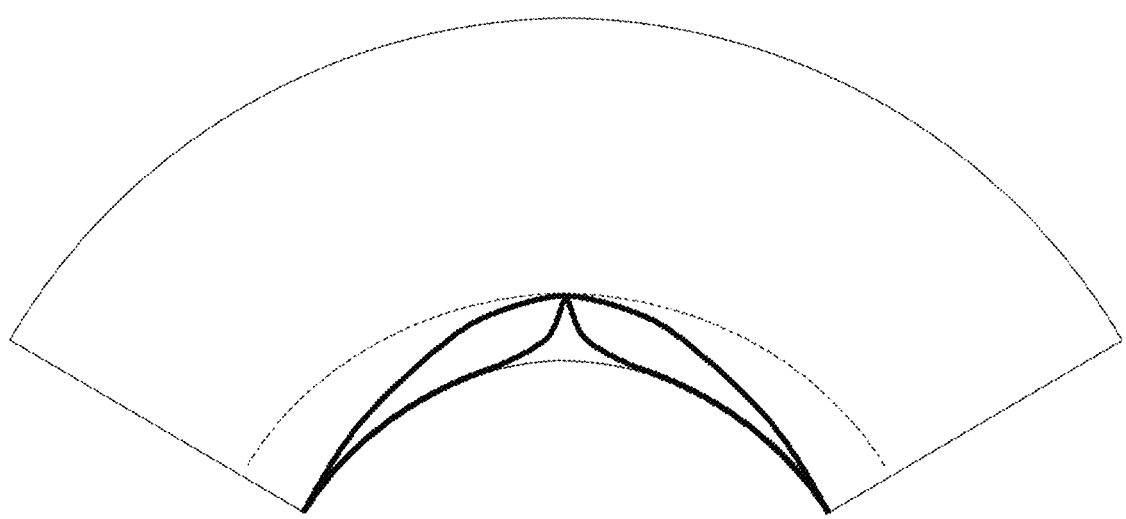

FIG. 9 illustrates an undulation satisfying these two requirements, namely the extended one in the figure and an undulation not satisfying the second requirement. A dashed line illustrates the limit of the first requirement.

Figure 10:
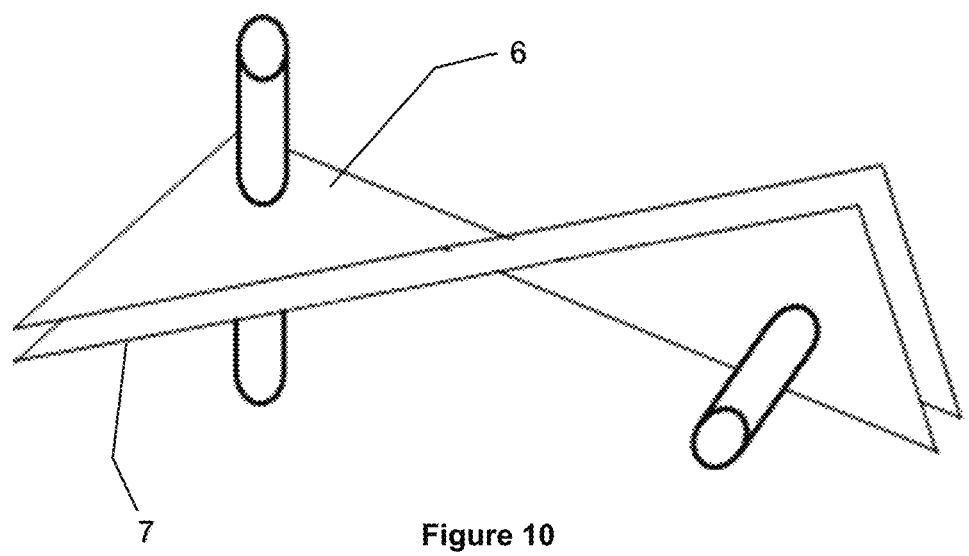

FIG. 10 shows a view of a forming device having a hold-down device 6, which has a hold-down device guiding area running parallel to the guiding area of the shaping tool 7. The areas respectively have a screwing and form a gap between them. For fastening, rod-shaped holders are arranged on the plates forming the hold-down guiding area and the guiding area.

LIST OF REFERENCE SIGNS

Semi-finished fiber product
Supply device
Deflection means
Infeed plane
First plane
Hold-down device
Shaping tool
Third plane
Guiding area
Second plane
First direction
Pulling device
Forming device
Concave cutting line section
Convex cutting line section
Forming section
Cutting line
Cutting line
First pulling plane
Second pulling plane
First forming plane
Infeed element
Fiber layer

The invention claimed is:

1. A forming device for continuous forming, comprising at least one hold-down device and at least one shaping tool, wherein the at least one hold-down device has a contact surface, the at least one hold-down device extends over at least one forming section of the at least one shaping tool, said at least one forming section extending along at least one first direction of the at least one shaping tool, and the at least one shaping tool, having an infeed end and an outfeed end opposite the infeed end, defines at least one guiding area;

a. wherein the at least one forming section extends out from a first plane transverse to the at least one first direction toward the outfeed end, wherein the first plane is the plane closest to the infeed end, in which the at least one guiding area has a cutting line including at least one first concave cutting line section in the first plane; and b. wherein the cutting line of the at least one guiding area also has a convex cutting line section in the first plane; and
c. wherein the at least one guiding area has at least one second concave cutting line section in a second plane which is truly parallel to the first plane;
d. wherein a first length between the contact surface and the at least one guiding area in the first plane, measured along a first normal to the area of the at least one guiding area on one of the at least one first concave cutting line section in the first plane is in the range of 0.8 to 1.2 times a second length between the contact surface and the at least one guiding area in the first plane, measured along a second normal to the area of the at least one guiding area on the one of the at least one first concave cutting line section in the first plane, wherein the first normal and the second normal are at an angle to one another in a range between 30° and 45° in the first plane; and
e. wherein a third length between the contact surface and the at least one guiding area in the second plane, measured along a third normal to the area of the at least one guiding area on one of the at least one second concave cutting line section in the second plane is in the range of 0.8 to 1.2 times a fourth length between the contact surface and the at least one guiding area in the second plane, measured along a fourth normal to the area of the at least one guiding area on the one of the at least one second concave cutting line section in the second plane, wherein the third normal and the fourth normal are at an angle to one another in a range between 30° and 45° in the second plane; and
f. wherein the first length is in a range of 0.8 to 1.2 times the third length; and
g. wherein the at least one first concave cutting line section of the at least one guiding area with the first plane differs from the at least one second concave cutting line section of the at least one guiding area with the second plane; and
h. wherein the at least one hold-down device, the at least one hold-down device's contact surface, or the at least one guiding area is at least partially designed as a ramp.

2. The forming device according to claim 1, wherein the distance between the first plane and the second plane, measured along the at least one first direction, is greater than the first length and the third length.

3. The forming device according to claim 1, wherein the contact surface of the at least one hold-down device has a first convex hold-down device cutting line section in a plane transverse to the at least one first direction.

4. The forming device according to claim 1, wherein in a third plane arranged between the first plane and the second plane, said third plane being parallel to the first plane, the second plane, or both of the first plane and the second plane, wherein the at least one guiding area has a cutting line having both a concave cutting line section and a convex cutting line section, wherein the distance from the third plane to the first plane, to the second plane, or to both of the first plane and the second plane is at least 20% of an extension of the at least one forming section or at least 0.2 m, or at least 20% of the extension of the at least one forming section and at least 0.2 m.

5. The forming device according to claim 4, wherein the cutting line of the at least one guiding area in the first plane differs from the cutting line of the at least one guiding area in the third plane.

6. The forming device according to claim 1, wherein the at least one first direction of a feed motion direction at least in the first plane, the second plane, or the third plane corresponds to a first forming plane or is parallel to a first forming plane, in which the infeed section, the outfeed section, or both the infeed section and the outfeed section is arranged, or corresponds to a vector from a centroid of the infeed end to a centroid of the outfeed end, or wherein the at least one hold-down device exhibits a longitudinal extension which is not parallel to the at least one first direction, to the feed motion direction, to the first forming plane, or to a tangential area of the at least one shaping tool at the infeed end parallel to the at least one first direction.

7. The forming device according to claim 1, wherein the forming device has at least two hold-down devices, wherein a first hold-down device distance between the at least two hold-down devices in the first plane is less than a second hold-down device distance between the at least two hold-down devices in the second plane or in a third plane; or
wherein the forming device has the at least one hold-down device and said at least one hold-down device exhibits in the first plane and transversely to the at least one first direction a first extension which is smaller than a second extension of the at least one hold-down device in the second plane or in the third plane transversely to the at least one first direction.

8. The forming device according to claim 1, wherein a longitudinal extension of the contact surface parallel to the at least one first direction has at least 60% of the longitudinal extension of the at least one forming section parallel to the at least one first direction.

9. The forming device according to claim 1 wherein the at least one shaping tool or the at least one guiding area on the first plane has a first transverse extension in the first plane, and the at least one hold-down device or the contact surface has a second transverse extension in the first plane, wherein the first transverse extension is longer than the second transverse extension, or wherein the at least one guiding area has a curvature in an infeed plane parallel to the first plane, transverse to the infeed plane, and parallel to the at least one first direction, said curvature having a maximum of 1 rad, wherein the first plane is between the infeed plane and the second plane or the third plane.

10. A system for continuous production of semi-finished products comprising:
a supply device for supplying semi-finished fiber product;
a pulling device, by means of which the semi-finished fiber product is removed from the supply device; and
a forming device arranged between the supply device and the pulling device; and
an introduction section arranged between the forming device and the supply device;
wherein the forming device comprises at least one hold-down device and at least one shaping tool, wherein the at least one hold-down device has a contact surface, the at least one hold-down device extends over at least one forming section of the at least one shaping tool, said at least one forming section extending along at least one first direction of the at least one shaping tool, and the at least one shaping tool, having an infeed end and an outfeed end opposite the infeed end, defines at least one guiding area;
a. wherein the at least one forming section extends out from a first plane transverse to the at least one first direction toward the outfeed end, wherein the first plane is the plane closest to the infeed end, in which the at least one guiding area has a cutting line including at least one first concave cutting line section in the first plane; and b. wherein the cutting line of the at least one guiding area also has a convex cutting line section in the first plane; and c. wherein the at least one guiding area has at least one second concave cutting line section in a second plane which is truly parallel to the first plane;

d. wherein a first length between the contact surface and the at least one guiding area in the first plane, measured along a first normal to the area of the at least one guiding area on one of the at least one first concave cutting line section in the first plane is in the range of 0.8 to 1.2 times a second length between the contact surface and the at least one guiding area in the first plane, measured along a second normal to the area of the at least one guiding area on the one of the at least one first concave cutting line section in the first plane, wherein the first normal and the second normal are at an angle to one another in a range between 30° and 45° in the first plane; and e. wherein a third length between the contact surface and the at least one guiding area in the second plane, measured along a third normal to the area of the at least one guiding area on one of the at least one second concave cutting line section in the second plane is in the range of 0.8 to 1.2 times a fourth length between the contact surface and the at least one guiding area in the second plane, measured along a fourth normal to the area of the at least one guiding area on the one of the at least one second concave cutting line section in the second plane, wherein the third normal and the fourth normal are at an angle to one another in a range between 30° and 45° in the second plane; and f. wherein the first length is in a range of 0.8 to 1.2 times the third length; and g. wherein the at least one first concave cutting line section of the at least one guiding area with the first plane differs from the at least one second concave cutting line section of the at least one guiding area with the second plane; and wherein the at least one hold-down device, the at least one hold-down device's contact surface, or the at least one guiding area is at least partially designed as a ramp.

11. The system according to claim 10, wherein the introduction section has at least one first deflection means to guide the removed semi-finished fiber product, wherein one shortest connection vector from the deflection means to the infeed end encloses an angle to the first direction which is less than or equal to 90°, or wherein the infeed end is convex, or the deflection means is convex.

12. The forming device according to claim 1, wherein the at least one hold-down device is rotatably mounted around a first axis parallel to the at least one hold-down device's longitudinal extension.

13. The forming device according to claim 1, wherein the contact surface of the at least one hold-down device is comprised of Teflon or has a coating made of Teflon.

14. The system according to claim 10, wherein at least one injection device or impregnation device for application of a binding agent is arranged upstream or downstream of the forming device or the forming section, and a curing device is arranged downstream of the at least one injection device or the impregnation device, or is arranged at the forming device or at the forming section.

\* \* \* \* \*